United States Patent
Monga et al.

(10) Patent No.: US 10,779,135 B1
(45) Date of Patent: Sep. 15, 2020

(54) DETERMINING WHICH FLOORS THAT DEVICES ARE LOCATED ON IN A STRUCTURE

(71) Applicant: Verizon Patent and Licensing Inc., Arlington, VA (US)

(72) Inventors: Manoj Monga, Bridgewater, NJ (US); Kevin Donnellan, North Brunswick, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 16/599,858

(22) Filed: Oct. 11, 2019

(51) Int. Cl.
*H04W 4/33* (2018.01)
*H04W 4/029* (2018.01)
*H04W 4/02* (2018.01)

(52) U.S. Cl.
CPC ............ *H04W 4/33* (2018.02); *H04W 4/025* (2013.01); *H04W 4/027* (2013.01); *H04W 4/029* (2018.02)

(58) Field of Classification Search
CPC ....... H04W 4/02; H04W 4/021; H04W 4/022; H04W 4/024; H04W 4/025; H04W 4/029; H04W 4/30; H04W 4/33; H04W 4/90
See application file for complete search history.

(56) References Cited

U.S. PATENT DOCUMENTS

| | | | |
|---|---|---|---|
| 9,952,354 B2* | 4/2018 | Springer | G01W 1/18 |
| 2007/0168124 A1* | 7/2007 | Dossas | G01C 21/005 701/481 |
| 2013/0158859 A1* | 6/2013 | Sathish | G01C 21/206 701/409 |
| 2014/0141796 A1* | 5/2014 | Marti | H04W 4/021 455/456.1 |
| 2015/0287085 A1* | 10/2015 | Windmueller | G06Q 30/0261 705/14.58 |
| 2017/0205232 A1* | 7/2017 | Shirai | G01C 5/06 |
| 2018/0048998 A1* | 2/2018 | Mahajan | H04M 1/72569 |
| 2018/0367952 A1* | 12/2018 | Devdas | H04W 4/029 |
| 2019/0260730 A1* | 8/2019 | Mainali | G06F 21/31 |
| 2019/0340876 A1* | 11/2019 | Northrup | G06Q 30/0261 |
| 2020/0045668 A1* | 2/2020 | Dormody | G01W 1/02 |

* cited by examiner

Primary Examiner — Jean A Gelin

(57) ABSTRACT

A device receives sensor data for a group of user equipment (UE) that are located within or on a structure. The device determines, based on a set of measured barometric pressures identified by the sensor data, a set of relative altitudes that identify altitudes of the group of UEs relative to one or more known geographic locations. The device determines, based on at least a portion of the sensor data and relative altitude data that identifies the set of relative altitudes, and for each UE of the group of UEs, a floor on which the UE is located. The device causes, based on determining respective floors on which the UEs of the group of UEs are located, a data structure to store a mapping of each UE to the respective floors. The device performs one or more actions based on the mapping.

20 Claims, 12 Drawing Sheets

| Example Altitudes / Relative Altitudes |
|---|
| • UE 102-1<br>Altitude 1: 100m<br>Relative Altitudes: 9m below Altitude 2, 18m below Altitude 3<br>• UE 102-2<br>Altitude 2: 109m<br>Relative Altitudes: 9m above Altitude 1, 9m below Altitude 3<br>• UE 102-3<br>Altitude 3: 118m<br>Relative Altitudes: 18m above Altitude 1, 9m above Altitude 3 |

114
Determine set of relative altitudes of UEs 102

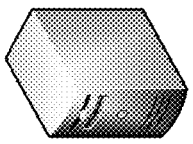

Location Tracking Platform 104

| Hive(s) | Swarm(s) |
|---|---|
| • One hive | • Three swarms |

112
Identify quantity of hives and swarms

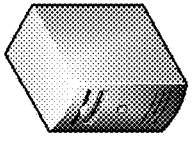

Location Tracking Platform 104

FIG. 1B

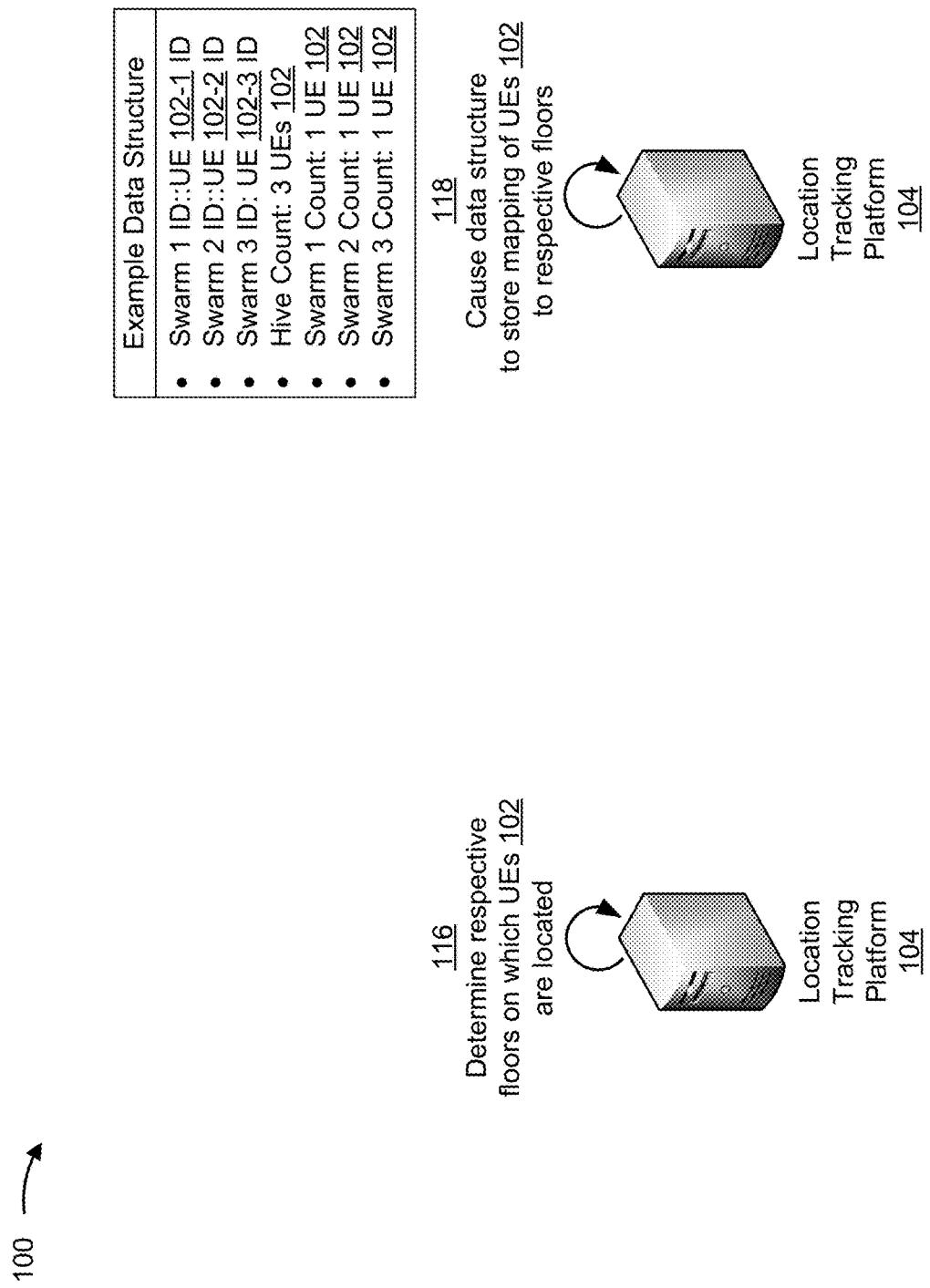

DETERMINING WHICH FLOORS THAT DEVICES ARE LOCATED ON IN A STRUCTURE

BACKGROUND

A mobile device may include one or sensors and/or applications that are used to determine a geographic location of the mobile device. For example, the mobile device may determine a geographic location of the mobile device using a global positioning system (GPS) or a similar type of technology. In some cases, the mobile device may include a barometric pressure sensor that may be used to determine a barometric pressure of a geographic location of the mobile device. In these cases, the barometric pressure may be used to determine a height of the mobile device (e.g., relative to a known position, such as ground level, sea level, and/or the like).

BRIEF DESCRIPTION OF THE DRAWINGS

FIGS. 1A-1G are diagrams of one or more example implementations described herein.

DETAILED DESCRIPTION OF PREFERRED EMBODIMENTS

Figure 1A:
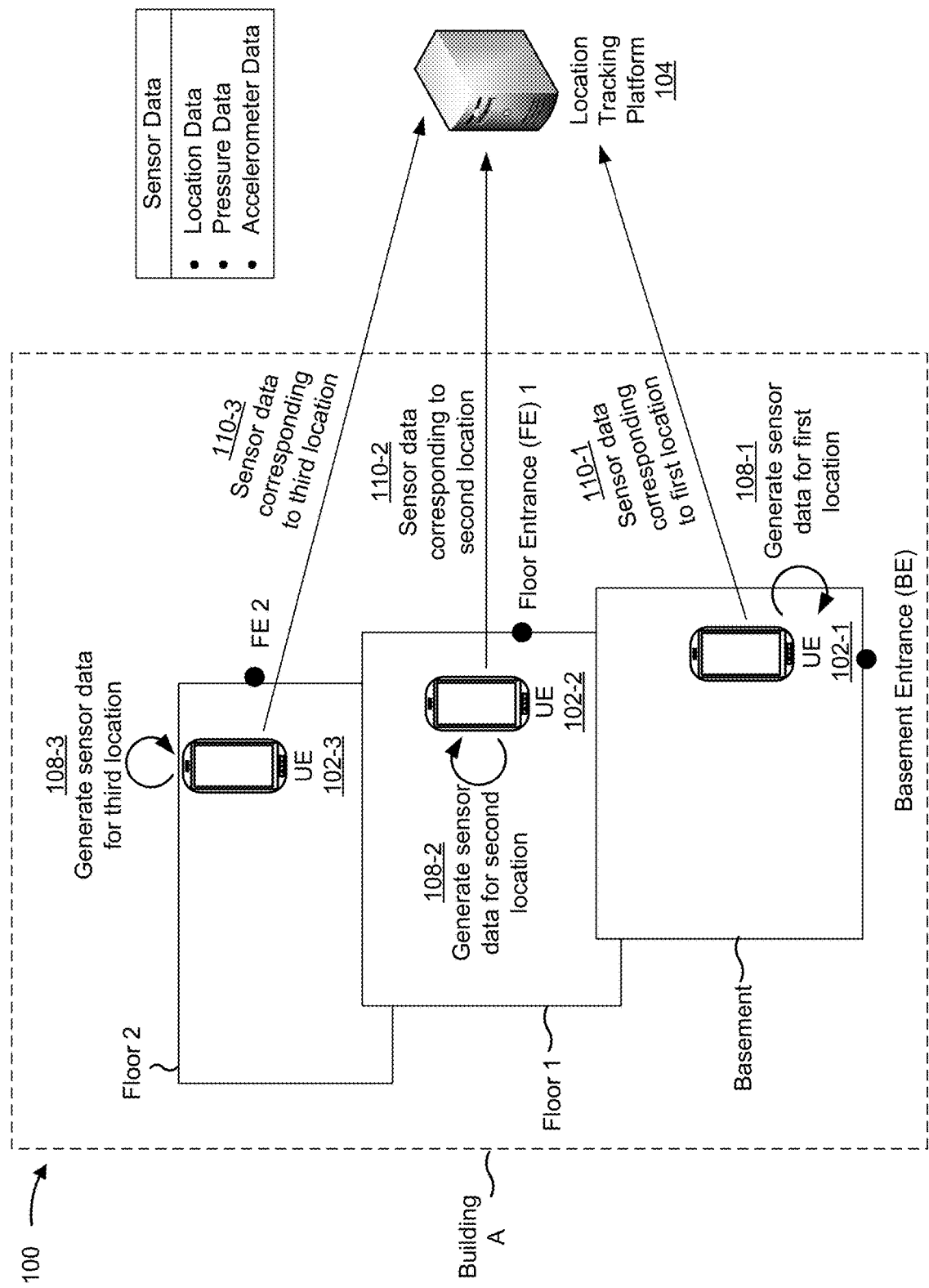

The following detailed description of example implementations refers to the accompanying drawings. The same reference numbers in different drawings may identify the same or similar elements.

A mobile device, such as user equipment (UE), may include one or more sensors and/or applications that may be used to determine a geographic location of the UE. For example, a UE may use a global positioning system (GPS) or a similar type of technology to determine a set of geographic coordinates that represent a geographic location of the UE. In some cases, the UE may use the one or more sensors and/or applications to determine an altitude of the UE (e.g., relative to a known position, such as ground level, sea level, and/or the like). For example, the UE may use a barometric pressure sensor to determine a barometric pressure of the geographic location and may use the barometric pressure to determine the altitude.

In some situations, such as when a UE enters a structure, the UE (and/or a cloud platform) may be unable to determine which floor the UE is located on within the structure. For example, if a blueprint of the structure is unavailable, and the structure has entrances at different floors (which may be located at different altitudes), the UE (and/or the cloud platform) may be unable to determine whether the floor that the device is entering the structure through is a ground level floor. Many solutions require installation of beacons at the structure, which is expensive and may require frequent maintenance to ensure that that beacons operate properly.

Furthermore, UEs may experience a barometric pressure bias while moving around within the structure. For example, the barometric pressure sensor of a UE will have a bias or a skew that prevents a measured barometric pressure from being able to be used to determine an absolute height. As a specific example, while the measured barometric pressure may be accurate to a certain degree, even a small bias or skew in the measured barometric pressure will cause a large bias or skew when determining an altitude of the UE. Consequently, the altitude determined by the UE may be within a threshold distance of an absolute altitude (e.g., 3.5 meters), but will not identify the absolute altitude. In some cases, such as when the determined altitude (which may be affected by the barometric pressure bias) is used to identify a floor that the UE is on within a structure, resources of the UE (e.g., processing resources, network resources, and/or the like) may be wasted identifying an incorrect floor.

According to some implementations described herein, a group of user equipment (UE) may be mobile within a structure, and a location tracking platform may determine which floors that respective UEs, of the group of UEs, are located on within the structure. For example, while moving around within the structure, the group of UEs may provide, to the location tracking platform, location data that identifies a set of geographic locations of the group of UEs, pressure data that identifies a set of measured barometric pressures that correspond to the set of geographic locations, accelerometer data that identifies directions in which respective UEs are moving, and/or the like. In this case, the location tracking platform may determine, based on the pressure data, a set of relative altitudes that identify altitudes of the group of UEs relative to each other (and/or relative to one or more known geographic locations). Additionally, the location tracking platform may determine, for each UE, a floor that the UE is located on based on the pressure data, relative altitude data and/or the accelerometer data. Furthermore, the location tracking platform may cause a data structure to store device floor data that identifies total quantities of UEs that are located on each of the particular floors. This may allow the location tracking platform to perform one or more actions based on the device floor data.

In this way, the location tracking platform determines respective floors that UEs, of the group of UEs, are located on while moving around within the structure. Additionally, by using a swarm technique to determine that subgroups of UEs are located on particular floors, the location tracking platform is able to efficiently and/or effectively verify and/or subsequently re-determine the respective floors that the UEs are located on (e.g., by determining the respective floors in a manner that reduces or eliminates barometric pressure bias). Furthermore, the location tracking platform determines the respective floors without a need to install beacons at the structure, thereby eliminating beacon installation costs, operational costs (e.g., an operational beacon may expend processing resources, network resources, memory resources, and/or the like), and/or maintenance costs. Additionally, by determining the respective floors that the UEs are located on, in a manner described herein, the location tracking platform is able to determine the respective floors regardless of whether the group of UEs enter the structure via different entrances and/or at different altitudes.

FIGS. 1A-1G are diagrams of one or more example implementations 100 described herein. Example implementation(s) 100 may include a group of user equipment (UE) 102 (shown as UE 102-1, UE 102-2, and UE 102-3) and a location tracking platform 104. As shown in FIGS. 1A-1G, the group of UEs 102 may periodically provide location tracking platform 104 with sensor data (e.g., while moving within (or on) a structure) to allow location tracking platform 104 to maintain a real-time (or near real-time) device structure count of a quantity of UEs 102 in the structure and device floor counts of quantities of UEs 102 that are located on respective floors of the structure. While one or more implementations describe three UEs 102, it is to be understood that this is provided by way of example, and that in practice, one or more implementations may be performed while any number of UEs 102 are moving around within the structure.

As shown in FIG. 1A, and by reference numbers 108-1, 108-2, and 108-3, the group of UEs 102 may generate sensor data for a set of geographic locations. In the example shown, UE 102-1 may generate sensor data for a first geographic location, UE 102-2 may generate sensor data for a second geographic location, and UE 102-3 may generate sensor data for a third geographic location.

The sensor data may include location data, pressure data, accelerometer data, and/or the like. The location data may identify the set of geographic locations of the group of UEs 102 (e.g., using a set of geographic coordinates). The pressure data may identify a set of measured barometric pressures that correspond to the set of geographic locations. In some implementations, the set of measured barometric pressures may be adjusted measured barometric pressures that have been adjusted based on barometric pressure biases, as described further herein. The accelerometer data may identify a set of speeds of the group of UEs 102 over time and/or a set of directions that the group of UEs 102 are moving in. For example, a UE 102 may include a motion sensor (e.g., an accelerometer, which may include a gyroscope) that can determine a speed of the device, an orientation of the device, a rotation/twist of the device, and/or the like.

In some implementations, the group of UEs 102 may be configured to generate the sensor data based on a condition being satisfied. For example, a UE 102 may be configured to generate sensor data based on determining that the UE 102 has entered the structure, based on a time condition being satisfied (e.g., a current measured time matches a configured time, a threshold time interval has passed, and/or the like), and/or the like. In some implementations, the group of UEs 102 may be configured to generate the pressure data based on detecting a horizontal movement. For example, a UE 102 (e.g., using the motion sensor) may detect that the device is in motion in a horizontal direction (e.g., a direction that is parallel with a floor of the structure). This may cause the UE 102 to periodically generate pressure data until the accelerometer stops detecting horizontal movement.

In some implementations, the group of UEs 102 may generate location data that identifies the set of geographic locations. For example, a UE 102 (e.g., UE 102-1, UE 102-2, and/or UE 102-3) may, based on the condition being satisfied, use a global positioning system (GPS) technology and/or a similar type of technology to generate location data that identifies a geographic location of the device.

Additionally, or alternatively, the group of UEs 102 may generate pressure data that identifies the set of measured barometric pressures that correspond to the set of geographic locations. For example, a UE 102 may include a barometric pressure sensor that allows the device to determine measured barometric pressures at a particular geographic location. In this case, the UE 102 may cause the barometric pressure sensor to determine a measured barometric pressure at the particular geographic location.

Additionally, or alternatively, the group of UEs 102 may generate accelerometer data that identifies the set of speeds of the group of UEs 102 (e.g., over time) and/or the set of directions that the group of UEs 102 are moving in. For example, a UE 102 may use a motion sensor to determine a speed of the device (e.g., between a first geographic location and a second geographic location), may determine a direction of the device, an orientation of the device, and/or the like.

In some implementations, location tracking platform 104 may determine a speed at which a UE 102 is moving between two or more time periods. For example, location tracking platform 104 may use the accelerometer data to determine a speed at which a UE 102 is moving, such that the UE 102 may be verified as moving by way of an elevator (e.g., which may transport UEs 102 at a constant speed), by walking horizontally along a particular floor, by walking up or down stairs, and/or the like.

In some implementations, a UE 102 may, based on determining that the device is located within the structure, flag the generated location data as being an entrance of the structure. In the example shown, UE 102-1 may generate location data for the first geographic location, which may be an entrance to a basement of the structure, UE 102-2 may generate location data for the second geographic location, which may be an entrance to a first floor of the structure, and UE 102-3 may generate location data for the third geographic location, which may be an entrance to a second floor of the structure.

In some implementations, the pressure data generated by the group of UEs 102 may include, as the set of measured barometric pressures, a set of adjusted measured barometric pressures that correspond to the set of geographic locations. In some cases, a barometric pressure sensor of a UE 102 may be recalibrated based on a barometric pressure bias to allow the UE 102 to use the recalibrated barometric pressure sensor to generate an adjusted measured barometric pressure. The barometric pressure bias may be used to offset a bias or skew of the barometric pressure sensor. The barometric pressure bias may be based on an average of respective differences between the measured and expected barometric pressures, a mean of the respective differences, a weighted average, a weighted mean, an average and/or a mean that excludes certain data points (e.g., a minimum value, a maximum value, and/or the like), and/or the like. In other cases, a UE 102 may adjust the measured barometric pressure without recalibrating the barometric pressure sensor (e.g., by performing a computation to adjust a measured barometric pressure based on a barometric pressure bias). In some implementations, the set of adjusted measured barometric pressures may be adjusted based on instructions received from location tracking platform 104, as will be described further herein.

As shown by reference numbers 110-1, 110-2, and 110-3, location tracking platform 104 may receive the sensor data from the group of UEs 102. For example, UE 102-1 may provide the sensor data for the first geographic location, UE 102-2 may provide the sensor data for the second geographic location, and UE 102-3 may provide the sensor data for the third geographic location. In this case, the group of UEs 102 may provide location tracking platform 104 with the sensor data for the set of geographic locations via a communication interface, such as a radio interface, an application programming interface (API), and/or another type of interface.

In some implementations, a UE 102 may provide sensor data corresponding to a geographic location as part of the same transmission. In some implementations, the UE 102 may provide the sensor data as part of separate transmissions (e.g., by transmitting the location data, the pressure data, and/or the accelerometer data, in two or three separate transmissions).

In some implementations, location tracking platform 104 may receive, from a UE 102, location data that identifies a geographic location as an entrance to the structure. In some implementations, location tracking platform 104 may determine that the location data is for an entrance to the structure based on the location data being the first transmission received from the UE 102.

In this way, location tracking platform 104 receives sensor data for the set of geographic locations of the group of UEs 102.

As shown in FIG. 1B, and by reference number 112, location tracking platform 104 may identify a quantity of hives and swarms. For example, location tracking platform 104 may identify a quantity of hives that include at least one UE 102 and may identify a quantity of swarms that include at least one UE 102. As used herein, the term "hive" may refer to the structure, a sectioned region of the structure (e.g., a structure or building may have a north tower and a south tower, an east wing and a west wing, and/or the like), and/or the like. In some implementations, such as when a structure has multiple sectioned regions, location tracking platform 104 may identify each sectioned region as a separate hive. As used herein, the term "swarm" may refer to a floor in the structure, a portion of a floor in the structure, and/or the like.

In some implementations, location tracking platform 104 may identify the quantity of hives based on the location data. For example, location tracking platform 104 may identify the quantity of hives based on the group of UEs 102 being within a threshold proximity of each other, based on comparing the location data with map data that identifies whether the set of geographic locations are part of a single structure, are part of a structure with multiple sectioned regions, and/or the like. In the example shown, location tracking platform 104 may identify that there is one hive (e.g., the structure).

Additionally, or alternatively, location tracking platform 104 may identify the quantity of swarms based on the pressure data. For example, because barometric pressure corresponds to altitude, a threshold difference in measured barometric pressure may correspond to an altitude difference that would be indicative of UEs 102 being on different floors. Consequently, location tracking platform 104 may compare the set of measured barometric pressures and may, based on the set of measured barometric pressures having values that are a threshold difference apart, identify the quantity of swarms. In the example shown, location tracking platform 104 may compare first, second, and third measured barometric pressures that correspond to UE 102-1, UE 102-2, and UE 102-3. This may allow location tracking platform 104 to identify that there are three separate swarms that include at least one UE 102.

As shown by reference number 114, location tracking platform 104 may determine a set of relative altitudes of the group of UEs 102. For example, location tracking platform 104 may determine, for the group of UEs 102, a set of relative altitudes that correspond to the set of geographic locations. The set of relative altitudes may identify altitudes of the group of UEs 102 relative to known geographic locations, such as altitudes relative to geographic locations of the group of UEs 102, altitudes relative to geographic locations identified as entrance points of particular floors of the structure, altitudes relative to a ground level and/or a sea level, and/or the like.

In some implementations (e.g., before determining the set of relative altitudes), location tracking platform 104 may first determine a set of altitudes that correspond to the set of geographic locations. For example, location tracking platform 104 may use a communication interface (e.g., an API or another type of communication interface) to obtain, from an altitude data storage device, altitude data that identifies a set of altitudes that correspond to the set of geographic locations.

To provide a specific example, location tracking platform 104 may use an API to provide, to a server with access to altitude data (e.g., a server hosted by the United States Geological Survey (USGS)), a request for an altitude value that identifies a first altitude corresponding to the first geographic location. The request may include location data that identifies the first geographic location (e.g., using geographic coordinates for the first geographic location). In this example, the server may use the location data to determine the first altitude of the first geographic location. The server may then provide, to location tracking platform 104, a response that includes particular altitude data that identifies the first altitude. Location tracking platform 104 may use the API to obtain altitude data for each altitude that corresponds to a geographic location of a UE 102. In some implementations, the group of UEs 102 may determine the set of altitudes and may provide altitude data that identifies the set of altitudes to location tracking platform 104.

In some implementations, location tracking platform 104 may determine the set of altitudes based on a set of expected barometric pressures. For example, location tracking platform 104 may determine a set of expected barometric pressures using the following equation:

$$P_{en} = (A_{Gn} - A_w) * \text{factor} + P_w \tag{1}$$

In the equation above, location tracking platform 104 may determine a difference between an altitude ($A_{Gn}$) at a particular geographic location (Gn) and a reference altitude ($A_w$) for a nearby weather station (e.g., by subtracting the reference altitude from the altitude at the particular geographic location). Additionally, location tracking platform 104 may multiply the difference against a factor and may add a reference barometric pressure for the weather station to an output of that multiplication. The factor may be a ratio between a pressure difference and an altitude difference (e.g., ~27.7 feet per hectopascals (hPa)).

Additionally, or alternatively, location tracking platform 104 may determine the set of altitudes based on a set of uncertainty values. For example, location tracking platform 104 may determine a set of uncertainty values that are capable of affecting an accuracy level when computing the set of altitudes. The set of uncertainty values may include a first subset of uncertainty values that are based on barometric pressure biases of the group of UEs 102 (e.g., which may be caused by the group of UEs 102 have a different device type or model, a different barometric pressure sensor, and/or the like), a second subset of uncertainty values that are based on barometric pressure changes occurring at the structure (e.g., which may be caused by a change in temperature outside of the structure, a change in temperature within the structure, and/or the like), and/or the like. To determine the set of uncertainty values, location tracking platform 104 may compare device type information for the group of UEs 102 (e.g., to determine the first subset of uncertainty values), may compare temperature data that identifies, over a time period, temperatures outside of the structure and/or temperatures inside of the structure (e.g., to determine the second subset of uncertainty values), and/or the like. In some implementations, the set of uncertainty values may be used to determine a percentage level of accuracy of a determined altitude of a UE 102.

In some implementations, location tracking platform 104 may determine a set of relative altitudes. For example, location tracking platform 104 may determine, for each altitude of the set of altitudes, a relative altitude that identifies the altitude relative to other altitudes of the set of altitudes. In this case, location tracking platform 104 may compare each respective altitude with one or more other altitudes of the set of altitudes to determine a difference between the altitude and the one or more other altitudes. This may allow location tracking platform 104 to determine a relative altitude that identifies a highest altitude (e.g., which may be based on a lowest measured barometric pressure and may correspond to a highest floor), a relative altitude that identifies a lowest altitude (e.g., which may be based on a highest measured barometric pressure and may correspond to a lowest floor), to sort the set of relative altitudes, and/or the like. In some implementations, location tracking platform 104 may determine the set of relative altitudes based on the factor and/or the set of uncertainty values.

In this way, location tracking platform identifies the number of hives and swarms and determines the set of relative altitudes of the group of UEs 102.

As shown in FIG. 1C, and by reference number 116, location tracking platform 104 may determine respective floors on which UEs 102, of the group of UEs 102, are located. For example, location tracking platform 104 may determine, for each UE 102 of the group of UEs 102, a floor on which the UE 102 is located based on the sensor data, relative altitude data that identifies the set of relative altitudes that correspond to the set of geographic locations, data that identifies spatial dimensions (e.g., heights) of respective floors on which each UE 102 is located (as described further herein), and/or the like.

In some implementations, location tracking platform 104 may determine, for a UE 102 of the group of UEs 102, a floor on which the UE 102 is located. For example, location tracking platform 104 may have determined that there are three separate floors of the structure that include at least one UE 102 and may determine, approximately, that each respective UE 102 is located on one of the three floors. Some implementations, that are described in connection with FIGS. 1E and 1F, may describe one or more additional ways to determine (and/or to more accurately determine) a floor on which a UE 102 is located. In some implementations, location tracking platform 104 may wait to determine the respective floors on which UEs 102 are located until a sufficient number of data points has been collected.

As shown by reference number 118, location tracking platform 104 may cause a data structure to store a mapping of UEs 102 to the respective floors on which the UEs 102 are located. In the example shown, location tracking platform 104 may have previously determined that there is one hive and three swarms. In this case, location tracking platform 104 may cause a data structure to store a mapping that associates device identifiers for the UEs 102 with floors identifiers for the respective floors, with the location data that identifies the set of geographic locations of the UEs 102, with any other relevant sensor data, with floor entrance identifiers that identify that the set of geographic locations are entrances to particular floors, and/or the like. Additionally, or alternatively, location tracking platform 104 may cause the data structure to store an updated hive count that identifies a quantity of UEs 102 in the structure (e.g., a quantity of three), updated swarm counts that identify quantities of UEs 102 that are located on the respective floors, and/or the like.

In this way, location tracking platform 104 determines the respective floors on which the UEs 102 are located and causes the data structure to store the mapping, such that location tracking platform 104 may begin tracking real-time (or near real-time) locations of the UEs 102 while the UEs 102 move throughout the structure.

Figure 1D:
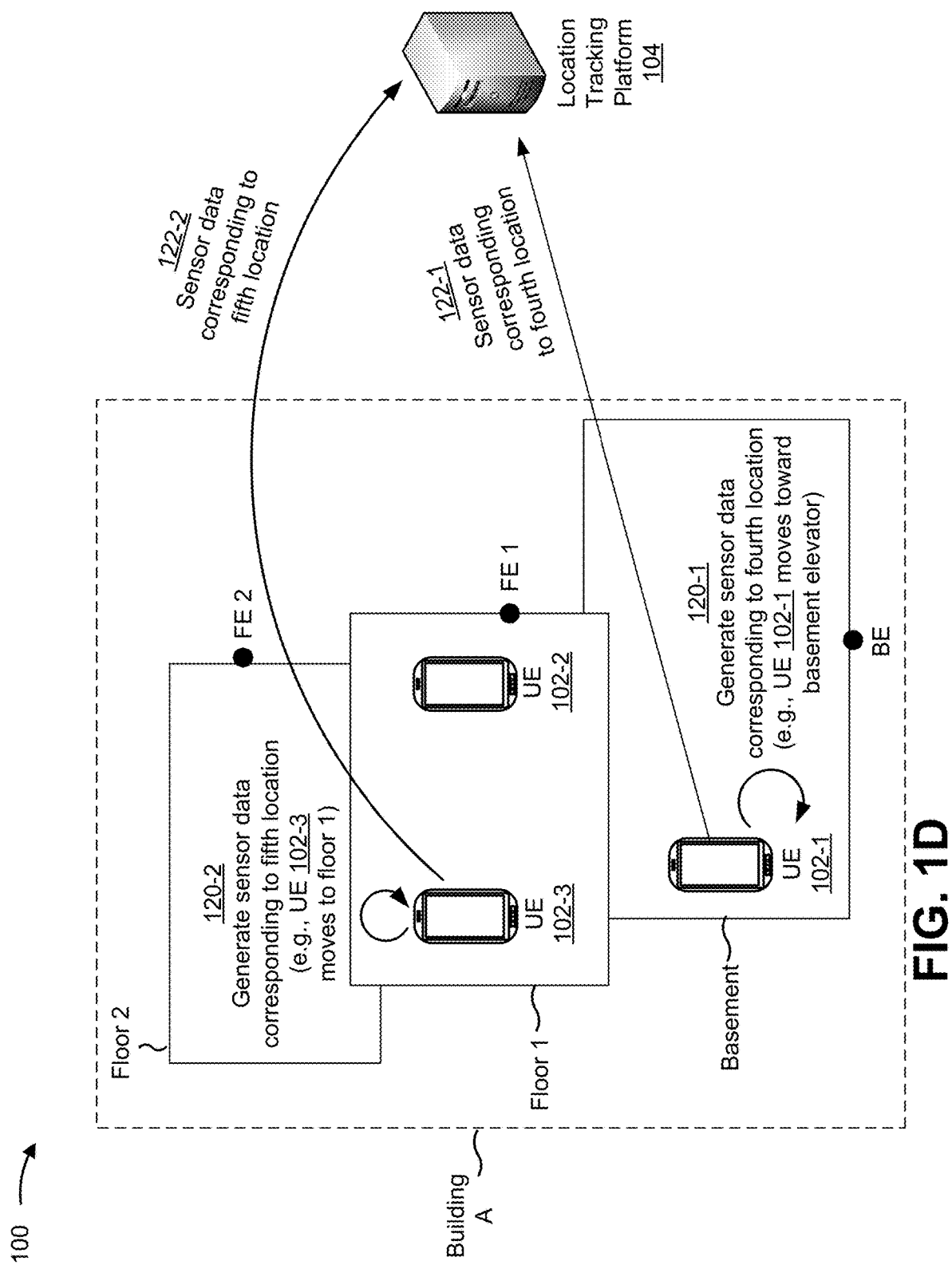

As shown in FIG. 1D, and by reference numbers 120-1 and 120-2, one or more UEs 102, of the group of UEs 102, may continue to generate sensor data corresponding to one or more other geographic locations (e.g., while moving around within the structure). For example, one or more UEs 102 (e.g., UE 102-1 and UE 102-3) may generate location data that identifies another set of geographic locations of the one or more UEs 102, pressure data that identifies another set of measured barometric pressures of the one or more UEs 102, accelerometer data that identifies speeds and/or directions of the one or more UEs 102, and/or the like.

In the example shown, UE 102-1 may have moved horizontally to a different part of the basement floor and UE 102-3 may have moved vertically to a different floor (e.g., from the second floor to the first floor). In this case, and as shown by reference number 120-1, UE 102-1 may generate location data that identifies a fourth geographic location, pressure data that identifies a measured barometric pressure corresponding to the fourth geographic location, accelerometer data that identifies a speed at which UE 102-1 is moving and/or a direction in which UE 102-1 is moving in, and/or the like. Additionally, and as shown by reference number 120-2, UE 102-3 may generate location data that identifies a fifth geographic location, pressure data that identifies a measured barometric pressure corresponding to the fifth geographic location, accelerometer data that identifies a speed at which UE 102-3 is moving and/or a direction in which UE 102-3 is moving in, and/or the like.

As shown by reference numbers 122-1 and 122-2, the one or more UEs 102 may provide the sensor data that corresponds to the fourth and fifth geographic locations to location tracking platform 104. For example, the one or more UEs 102 (e.g., UE 102-1 and UE 102-3) may use the communication interface to provide location tracking platform 104 with the sensor data that corresponds to the fourth and fifth geographic locations.

In this way, location tracking platform 104 is periodically provided with sensor data while the group of UEs 102 are moving within the structure.

Figure 1E:
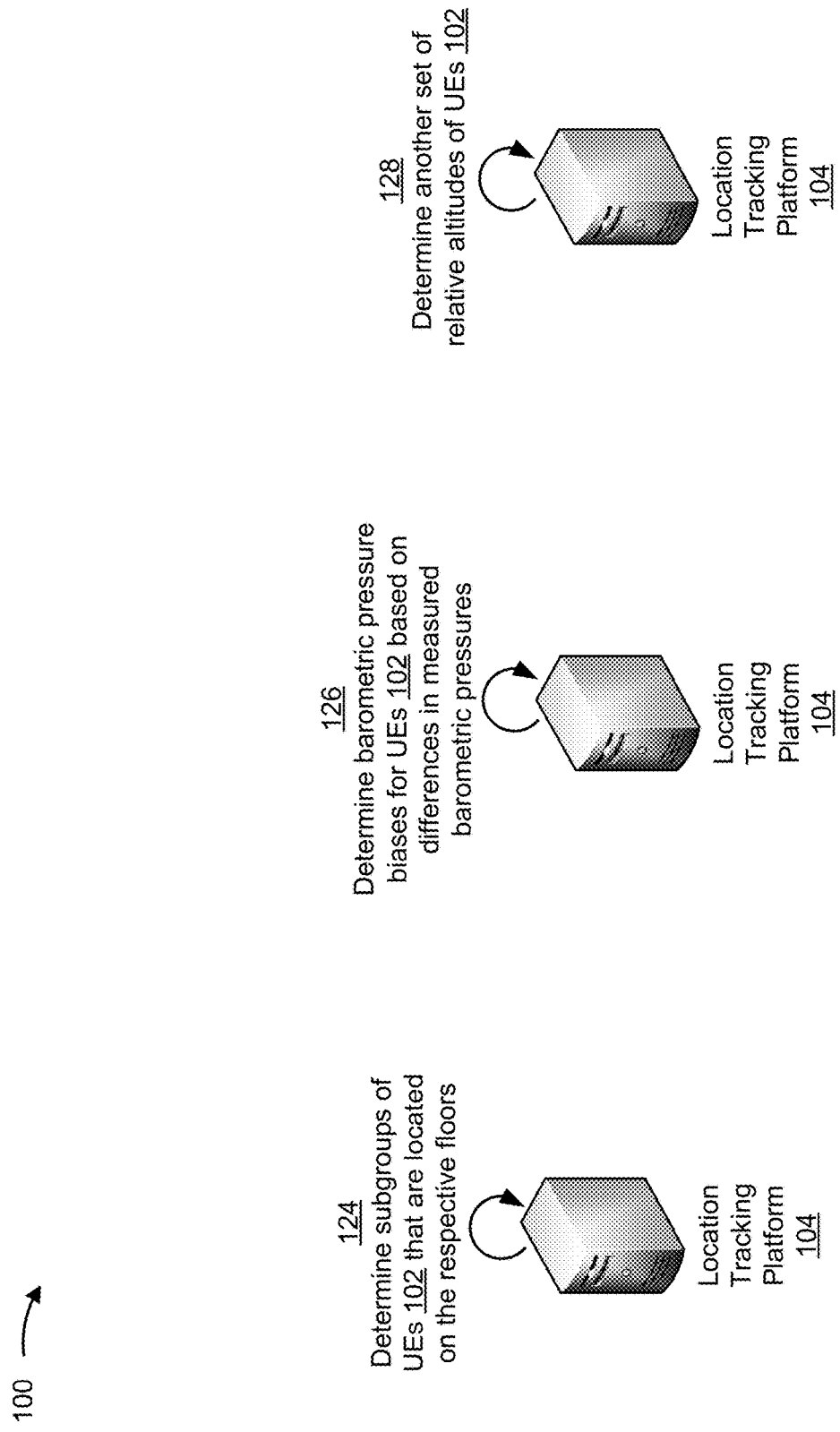

As shown in FIG. 1E, and by reference number 124, location tracking platform 104 may determine subgroups of UEs 102 that are located on the respective floors. For example, location tracking platform 104 may determine, for each floor that has been previously determined to include at least one UE 102, a subgroup of UEs 102 that are located on the floor.

In some implementations, location tracking platform 104 may determine one or more directions in which the group of UEs 102 are moving (e.g., the one or more directions may be used to determine the subgroups of UEs 102 that are located on the respective floors). For example, location tracking platform 104 may be able to determine whether each respective UE 102 has remained on the same floor or moved to a different floor based on one or more directions identified by the accelerometer data. A direction that corresponds to a horizontal movement may indicate that a UE 102 has remained on the same floor, a direction that corresponds to a vertical movement may indicate that a UE 102 is moving to a different floor (e.g., via an elevator), and a direction that corresponds to a concurrent horizontal and vertical movement may indicate that a UE 102 is moving to a different floor (e.g., via stairs or an escalator). Furthermore, if a UE 102 reports sensor data indicating a first direction that corresponds to a vertical movement, and the UE 102 subsequently reports sensor data indicating a second direction that corresponds to a horizontal movement, the vertical movement and subsequent horizontal movement may be indicative of the UE 102 beginning to move around on a new floor in the structure.

In some implementations, location tracking platform 104 may determine a subgroup of UEs 102 that are located on a floor based on the one or more directions that the group of UEs 102 are moving (as identified by the accelerometer data). For example, location tracking platform 104 may reference the data structure that stores the mapping of particular UEs 102 to respective floors to determine the floor that an initial subgroup of UEs 102 were determined to be located on (e.g., prior to receiving the sensor data that corresponds to the fifth and sixth geographic locations). Additionally, location tracking platform 104 may reference the accelerometer data to determine whether any UEs 102, of the group of UEs 102, have moved to a new floor. This will allow location tracking platform 104 to determine the subgroup of UEs 102 that are located on the floor based on referencing the mapping and the accelerometer data. In some cases, location tracking platform 104 may determine the subgroups of UEs 102 that are located on the respective floors in a manner that eliminates one or more barometric pressure biases (as further described below).

In the example shown in FIG. 1D, location tracking platform 104 may have received sensor data from UE 102-1 indicating that UE 102-1 is moving in a first direction corresponding to a horizontal movement and may have received sensor data from UE 102-3 indicating that UE 102-3 is moving in a second direction corresponding to a vertical movement (e.g., from the second floor to the first floor). In this example, location tracking platform 104 may process the sensor data to determine each direction that UE 102-1 and UE 102-3 are moving in. This may allow location tracking platform 104 to determine, based on each direction, that UE 102-1 has remained on the same floor and that UE 102-3 has moved to a new floor.

As shown by reference number 126, location tracking platform 104 may determine one or more barometric pressure biases for the group of UEs 102 based on differences in measured barometric pressures. For example, a barometric pressure sensor of a UE 102 may experience a barometric pressure bias that skews measured barometric pressures determined by the sensor. Consequently, measured barometric pressures that location tracking platform 104 uses to determine relative altitudes might be skewed because of the barometric pressure bias. To address this, location tracking platform 104 may use one or more techniques described herein to process the sensor data in a manner that allows location tracking platform 104 to determine barometric pressure biases of the UEs 102, such that location tracking platform 104 may be able to more accurately determine relative altitudes of the UEs 102, as further described below.

In some implementations, location tracking platform 104 may determine a barometric pressure bias for a UE 102 based on differences between measured barometric pressures. For example, location tracking platform 104 may determine a difference between a measured barometric pressure that is determined by a UE 102 and an average barometric pressure that is based on other measured barometric pressures determined by the UE 102 and/or one or more other UEs 102 that are on the same floor as the UE 102, one or more other UEs 102 that are within a threshold distance of the UE 102, one or more other UEs 102 that are within a threshold distance of a known geographic location, and/or the like. In this case, location tracking platform 104 may determine the barometric pressure bias for the UE 102 based on the difference. Location tracking platform 104 may determine barometric pressure biases for the one or more other UEs 102 (e.g., that are located on the same floor as the UE 102) in the same manner.

In some implementations, location tracking platform 104 may cause the one or more UEs 102 to determine a set of adjusted measured barometric pressures. For example, location tracking platform 104 may provide, to the one or more UEs 102 that are determined to have one or more corresponding barometric pressure biases, a set of instructions that allow the one or more UEs 102 to recalibrate the barometric pressure sensor and/or to determine one or more adjusted measured barometric pressures that have been adjusted based on the one or more barometric pressure biases. In some implementations, location tracking platform 104 may determine the set of adjusted measured barometric pressures (e.g., without additional data transmissions to the one or more UEs 102).

As shown by reference number 128, location tracking platform 104 may determine another set of relative altitudes of the group of UEs 102. For example, location tracking platform 104 may determine another set of relative altitudes based on the set of adjusted barometric pressures that have been adjusted based on the one or more barometric pressure biases. The other set of relative altitudes may be determined in a manner described in connection with FIG. 1B.

In this way, location tracking platform 104 determines the subgroups of UEs 102 that are located on the respective floors. Furthermore, by determining another set of relative altitudes of the group of UEs 102, location tracking platform 104 may use the other set of relative altitudes to verify that the subgroups of UEs 102 are in fact located on the respective floors, to re-determine the subgroups of UEs 102 that are located on the respective floors, and/or the like, as further described below. Additionally, location tracking platform 104 determines the other set of relative altitudes in a manner that reduces or eliminates barometric pressure bias, thereby conserving resources that would otherwise be wasted computing and/or transmitting inaccurate measured barometric pressures.

Figure 1F:
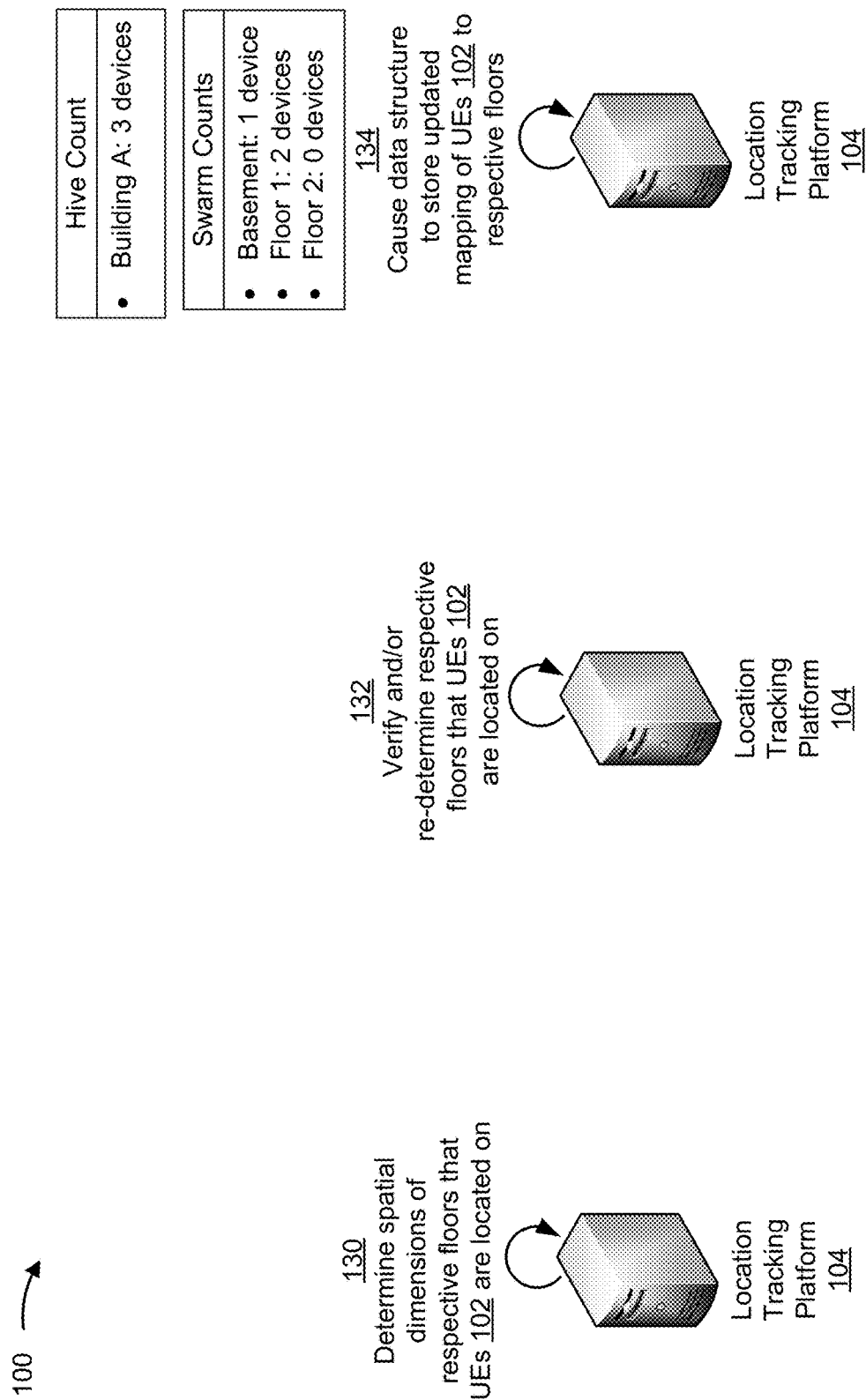

As shown in FIG. 1F, and by reference number 130, location tracking platform 104 may determine spatial dimensions of respective floors on which the group of UEs 102 are located. For example, location tracking platform 104 may determine, for each floor on which at least one UE 102 is located, spatial dimensions (e.g., heights) of the floor to improve an accuracy at which location tracking platform 104 is able to continue to determine the respective floors on which the UEs 102 are located (e.g., while the group of UEs are moving around in the structure). Spatial dimensions of a floor, as used herein, may refer to a height (e.g., an altitude) of the floor, a distance between two adjacent floors, a vertical geographic area of a floor, and/or the like. Additionally, in some cases, location tracking platform 104 may determine spatial dimensions of one or more components of a floor and/or objects within the floor, such as a location of an elevator on the floor, a location of a stairwell, a location of one or more doors that are found on the floor, and/or the like. One or more techniques for determining the spatial dimensions are described below.

In some implementations, location tracking platform 104 may determine heights of the respective floors on which the group of UEs 102 are located based on the pressure data. For example, location tracking platform 104 may have used the accelerometer data to identify one or more subgroups of UEs 102 that are located on the respective floors within the structure. In this case, location tracking platform 104 may determine, for each subgroup of UEs 102 that are identified as being located on the respective floors of the structure, a height of a floor based on a graphical distribution (e.g., a probability distribution curve) of floor height probabilities that identify likelihoods of the floor being particular heights, based on an output of a Kalman filtering technique, based on an output of a data model that has been trained using machine learning, and/or the like, as each described below.

In some implementations, location tracking platform 104 may determine a height of a floor based on a graphical distribution of floor height probabilities that identify likelihoods of the floor being particular heights. For example, location tracking platform 104 may generate a probability distribution curve based on a standard deviation of relative altitudes for a subgroup of UEs 102 that are determined to be located on the floor. Additionally, location tracking platform 104 may determine, based on the graphical distribution, a floor height lower bound value, a floor height upper bound value, an average floor height, and/or the like. The portion of the graphical distribution that is between the floor height lower bound value and the floor height upper bound value represents the most probable height of the floor.

Additionally, or alternatively, location tracking platform 104 may predict the height of the floor using the Kalman filtering technique. For example, location tracking platform 104 may use the Kalman filtering technique to remove particular data points that are associated with a threshold level of uncertainty and may generate a probability distribution curve based on the remaining data points. To provide a specific example, a storm may have caused temperature to spike which may have caused an increase in a barometric pressure bias of the barometric pressure sensors of the group of UEs 102. In this case, location tracking platform 104 may process the pressure data that identifies the measured barometric pressure that have been affected by the barometric pressure bias using the Kalman filtering technique. For example, location tracking platform 104 may modify one or more weights of a Kalman filter such that measured barometric pressures that are determined during the storm receive a lower weight relative to measured barometric pressures that are determined before the storm (and are likely to be less affected by the barometric pressure bias). In this way, location tracking platform 104 may use the Kalman filtering technique to predict the height of the floor.

Additionally, or alternatively, location tracking platform 104 may predict a height of a floor that a subgroup of UEs 102 are located on using the data model that has been trained using machine learning. For example, the data model may have been trained by using one or more machine learning techniques (e.g., a clustering technique, a regression technique, a neural network, and/or the like) to process historical sensor data, historical relative altitude data, historical mapping data that maps UEs 102 to particular floors, and/or the like. In some cases, the data model may have been trained to predict a height of a floor by assigning weights to historical data values based on likelihoods of those historical data values being affected by barometric pressure biases and/or related events that can affect an accuracy at which a UE 102 may be identified as being located on a particular floor. To use the data model, location tracking platform 104 may provide, as input to the data model, at least a portion of the sensor data and/or the relative altitude data. This may cause the data model to output one or more floor height scores that indicate likelihoods of particular heights being the height of the floor.

As shown by reference number 132, location tracking platform 104 may verify and/or re-determine the respective floors that the UEs 102, of the group of UEs 102, are located on within the structure. For example, location tracking platform 104 may, for each UE 102 of the group of UEs 102, verify the floor on which the UE 102 has been determined to be located based on the spatial dimensions (e.g., the height) of the floor. As an example, location tracking platform 104 may have determined a height of a UE 102 and may compare the height with the spatial dimensions of the floor that the UE 102 had previously been predicted to be located on. In this example, location tracking platform 104 may verify that the UE had been determined to be located on the correct floor based on the comparison. In some cases, the floor on which a UE 102 had been determined to be located may have been determined incorrectly. In these cases, location tracking platform 104 may re-determine an appropriate floor that the UE 102 is located on and may update contents of the data structure to reflect the appropriate floor.

As shown by reference number 134, location tracking platform 104 may cause the data structure to store updated mappings of UEs 102 to the respective floors. Additionally, or alternatively, location tracking platform 104 may cause the data structure to associate the device identifiers of UEs 102 with one or more types of sensor data (e.g., the accelerometer data that identifies directions the UEs 102 are moving in), with the relative altitude data, and/or the like. Additionally, or alternatively, location tracking platform 104 may cause the data structure to store updated device floor counts and an updated device structure count.

Additionally, or alternatively, location tracking platform 104 may store an indication of which sensor data has been most recently received from the group of UEs 102. For example, when verifying and/or re-determining the respective floors on which particular UEs 102 are located, location tracking platform 104 may use previously received sensor data as reference data (e.g., sensor data for the set of geographic locations may be used as reference data when verifying the respective floors based on the sensor data for the one or more other geographic locations). Consequently, after verifying and/or re-determining the respective floors on which the group of UEs 102 are located, location tracking platform 104 may mark the sensor data that had been used for the most recent verification and/or redetermination for use as reference data during the subsequent attempt to verify and/or redetermine the respective floors that the UEs 102 are located on.

In this way, location tracking platform 104 accurately determines the respective floors that the group of UEs 102 are located on.

Figure 1G:
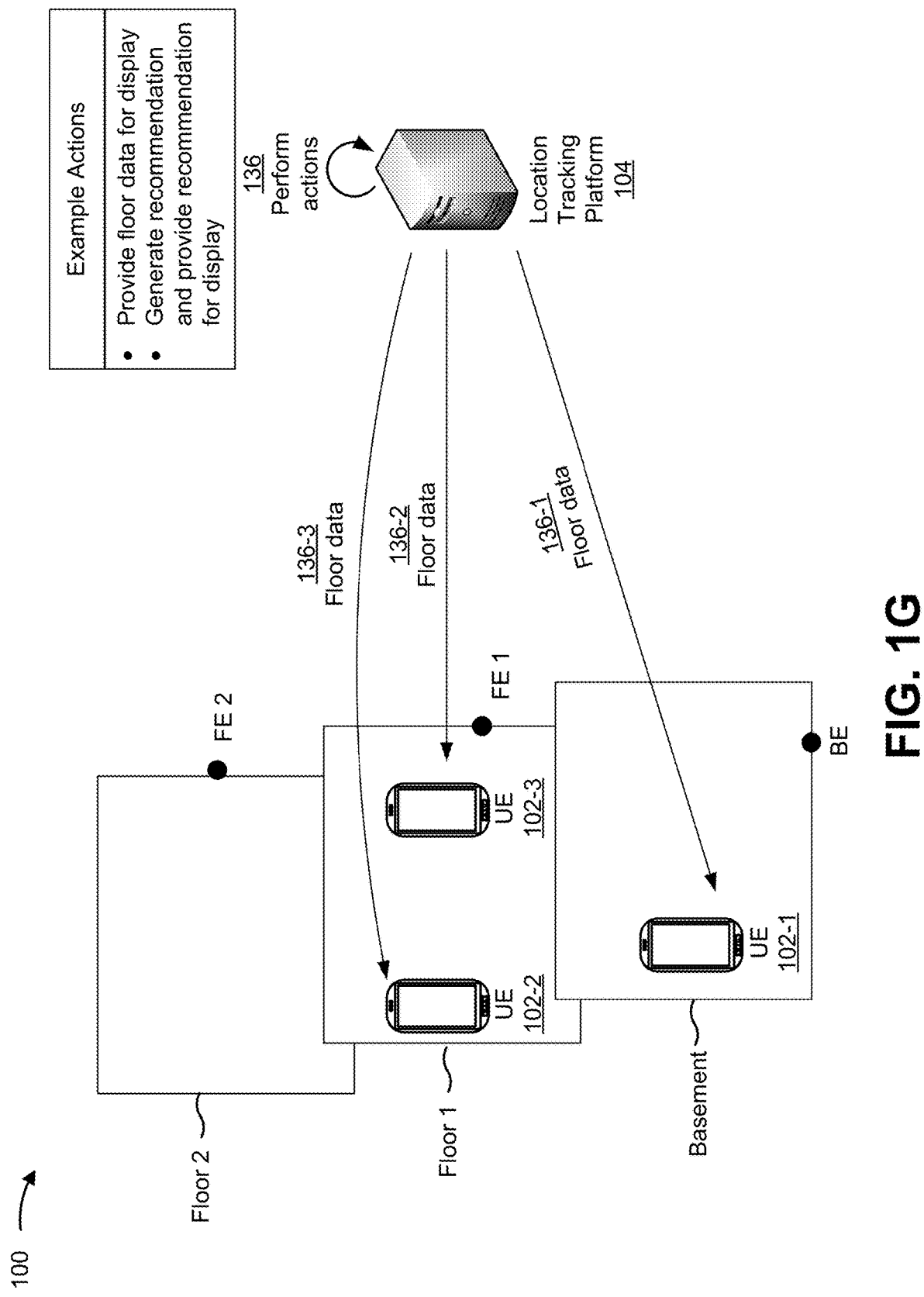

As shown in FIG. 1G, and by reference number 136, location tracking platform 104 may perform one or more actions. For example, location tracking platform 104 may perform one or more actions based on updating the data structure to store the updated mapping of the UEs 102 to the respective floors. The one or more actions may include causing display data to be displayed via an interface that is accessible to the group of UEs 102, generating and providing one or more recommendations for display based on the identified locations of the group of UEs 102 within the structure, causing an alert to be triggered, causing an autonomous device or machine to perform one or more actions, and/or the like, as each described below.

In some implementations, location tracking platform 104 may cause display data to be displayed via an interface that is accessible to the group of UEs 102. For example, the group of UEs 102 may have access to a web interface and/or an application interface that is capable of being used to display a visualization of the contents of the data structure. This may allow users to view which floors other users are located on, such as when a first responder is attempting to assist someone who may be in danger, when a parent or guardian is attempting to locate a child or elderly person, and/or the like.

Additionally, or alternatively, location tracking platform 104 may generate and provide one or more recommendations for display. For example, location tracking platform 104 may be configured with one or more rules that cause location tracking platform 104 to generate and display a particular recommendation. As a specific example, if a threshold quantity of UEs 102 are moving toward a particular location in the structure (e.g., a group of firefighters moving toward a fire, toward one or more individuals in need of rescue, and/or the like), and new UEs 102 arrive at an entrance of the structure, location tracking platform 104 may generate a recommendation for the new UEs 102 to begin moving toward the location in the structure. Additionally, location tracking platform 104 may cause the recommendation to be displayed via the interface, such that a user may view a map of the structure to identify how to get to the location in the structure, such that a user may view a set of navigational directions that indicate how to get to the location in the structure, and/or the like.

Additionally, or alternatively, location tracking platform 104 may generate and provide a first user with a notification indicating that a UE 102 associated with a second user is within a threshold distance of a configured geographic location and/or height. For example, location tracking platform 104 may be configured to generate and provide a first user with a notification when a second user (e.g., who may be a child, an elderly person, and/or the like) is within the threshold distance of an unsafe area, is moving toward an exit of a floor or area that the second user is not supposed to vacate, and/or the like. In this case, location tracking platform 104 may compare a geographic location and/or a height of the UE 102 with the threshold distance of the configured geographic location and/or height. This may allow location tracking platform 104 to generate and provide the first user with the notification if the geographic location and/or height of the UE 102 are within the threshold distance of the configured geographic location and/or height.

Additionally, or alternatively, location tracking platform 104 may cause an alert to be triggered. For example, location tracking platform 104 may be configured with conditions that, if satisfied, cause location tracking platform 104 to generate and provide instructions that are capable of triggering the alert to a target device.

The target device may be a fire alarm, a computer capable of communicating with the fire alarm, an overhead speaker, a computer capable of communicating with the overhead speaker, one or more devices at a police station and/or fire department, a device of a system administrator who manages a network of the structure (e.g., who may be capable of transmitting an alert to devices of individuals who work inside the structure), and/or the like. The conditions may include a condition to generate and provide instructions based on receiving an indication that an emergency situation has occurred, a condition to generate and provide instructions based on predicting that an emergency situation has occurred (e.g., by using machine learning to analyze one or more types of data described above), a condition to generate and provide instructions based on receiving a request to trigger the alert, and/or the like. To provide a few specific examples, when the target device is the fire alarm, the alert may be the fire alarm. When the target device is the overhead speaker, the device at the police department or fire station, and/or the device of the system administrator who manages the network of the structure, the alert may be a message describing the emergency situation, when the target device is a device at the police station or fire department.

Additionally, or alternatively, location tracking platform 104 may cause an autonomous device or machine to perform one or more actions. For example, location tracking platform 104 may cause an autonomous device or machine to perform one or more actions based on a condition (described above) being satisfied. As an example, location tracking platform 104 may generate and provide instructions to a computer associated with a fire truck to cause a deluge gun of the fire truck to be positioned at a proper angle to begin putting out a fire. As another example, location tracking platform 104 may generate and provide instructions to a drone to cause the drone to begin capturing images of the outside of the structure and/or a specific part of the inside of the structure. The drone may provide the images to location tracking platform 104, to the group of UEs 102, and/or to one or more other devices.

In this way, location tracking platform 104 determines respective floors on which UEs 102, of the group of UEs 102, are located while moving around within the structure. Additionally, by using a swarm technique to determine that subgroups of UEs 102 are located on particular floors, location tracking platform 104 is able to efficiently and/or effectively verify and/or subsequently re-determine the respective floors on which the UEs 102 are located (e.g., by determining the respective floors in a manner that reduces or eliminates barometric pressure bias).

As indicated above, FIGS. 1A-1G are provided as one or more examples. Other examples can differ from what is described with regard to FIGS. 1A-1G.

Figure 2:
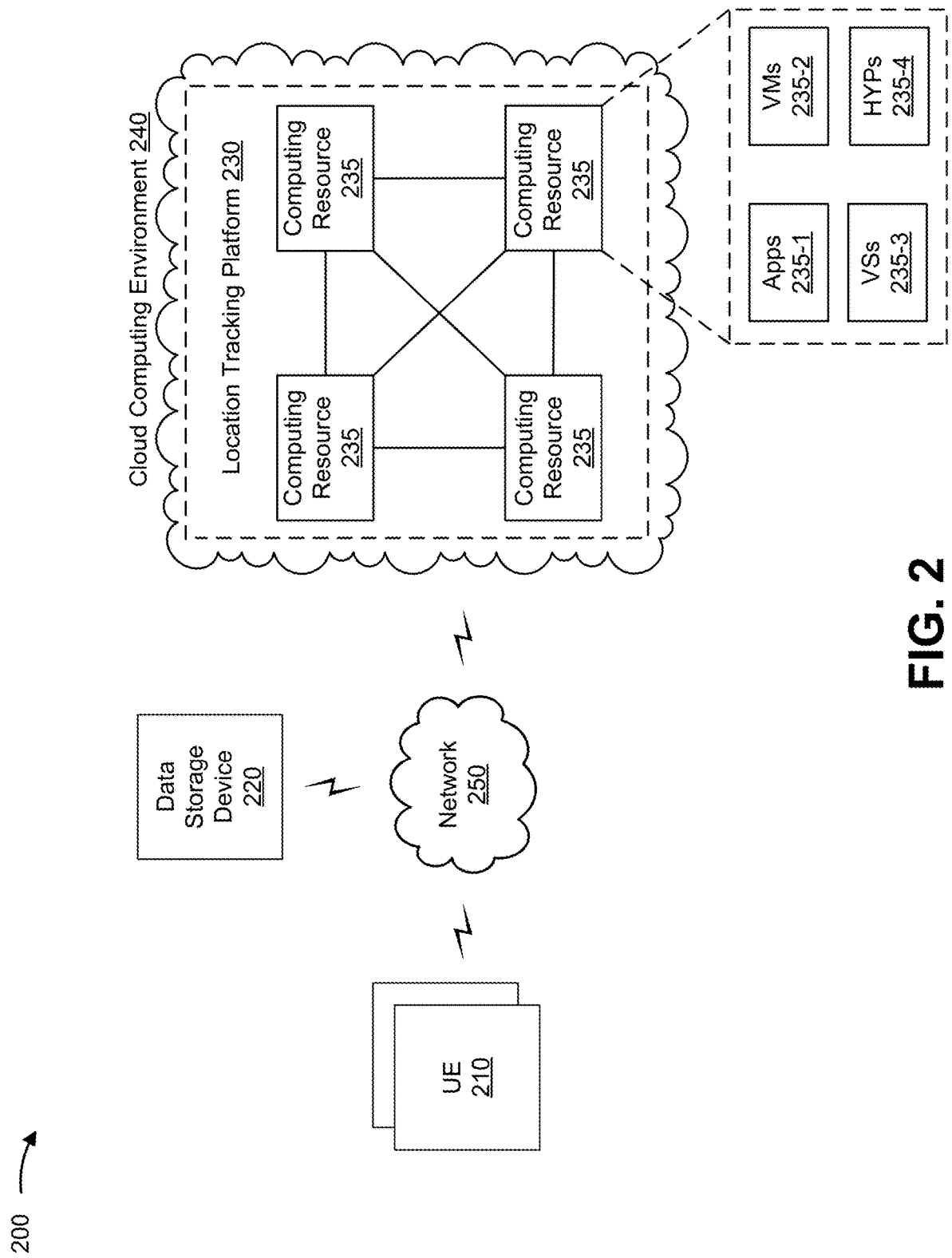
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a group of user equipment (UE) 210, a data storage device 220, a location tracking platform 230 that is supported by a cloud computing environment 240, and/or a network 250. Devices of environment 200 may interconnect via wired connections, wireless connections, or a combination of wired and wireless connections.

UE 210 includes one or more devices capable of receiving, storing, processing, and/or providing information, such as information described herein. For example, UE 210 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, an Internet of Things (IoT) device (e.g., a smart appliance, a smart light, a connected vehicle, and/or the like), and/or a similar device. In some implementations, UE 210 may include one or more sensors, such as a motion sensor (e.g., an accelerometer), a location tracking sensor, a barometric pressure sensor, and/or another type of sensor. In some implementations, UE 210 may host and/or support an application that is capable of performing one or more measurements that are described in connection with FIGS. 1A-1G, an application that is capable of providing display data for display via a user interface, and/or the like. In some implementations, UE 210 may use one or more interface (e.g., an application programming interface (API) or another type of communication interface) to communicate with data storage device 220, location tracking platform 230, and/or the like.

Data storage device 220 includes one or more devices capable of receiving, storing, processing, and/or providing information described herein. For example, data storage device 220 may include a server device or a group of server devices. In some implementations, data storage device 220 may support a data structure that stores sensor data, relative altitude data, user identifiers for a group of UEs 210, floor identifiers for a set of floors of a structure, and/or any other data described in connection with FIGS. 1A-1G.

Location tracking platform 230 includes one or more devices capable of receiving, storing, generating, determining, and/or providing information, such as information described herein. For example, location tracking platform 230 may include a server device (e.g., a host server, a web server, an application server, etc.), a data center device, or a similar device. In some implementations, location tracking platform 230 may communicate with a group of UEs 102 and/or with data storage device 220 in a manner described in connection with FIGS. 1A-1G.

In some implementations, as shown, location tracking platform 230 may be hosted in cloud computing environment 240. Notably, while implementations described herein describe location tracking platform 230 as being hosted in cloud computing environment 240, in some implementations, location tracking platform 230 might not be cloud-based (i.e., may be implemented outside of a cloud computing environment) or may be partially cloud-based.

Cloud computing environment 240 includes an environment that hosts location tracking platform 230. Cloud computing environment 240 may provide computation, software, data access, storage, etc. services that do not require end-user knowledge of a physical location and configuration of system(s) and/or device(s) that hosts location tracking platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host location tracking platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by UE 210, data storage device 220, and/or the like. Application 235-1 may eliminate a need to install and execute the software applications on these devices. For example, application 235-1 may include software associated with location tracking platform 230 and/or any other software capable of being provided via cloud computing environment 240. In some implementations, one application 235-1 may send/receive information to/from one or more other applications 235-1, via virtual machine 235-2.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., UE 210, data storage device 220, and/or the like), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Network 250 includes one or more wired and/or wireless networks. For example, network 250 may include a cellular network (e.g., a 5G network, a 4G network, such as an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
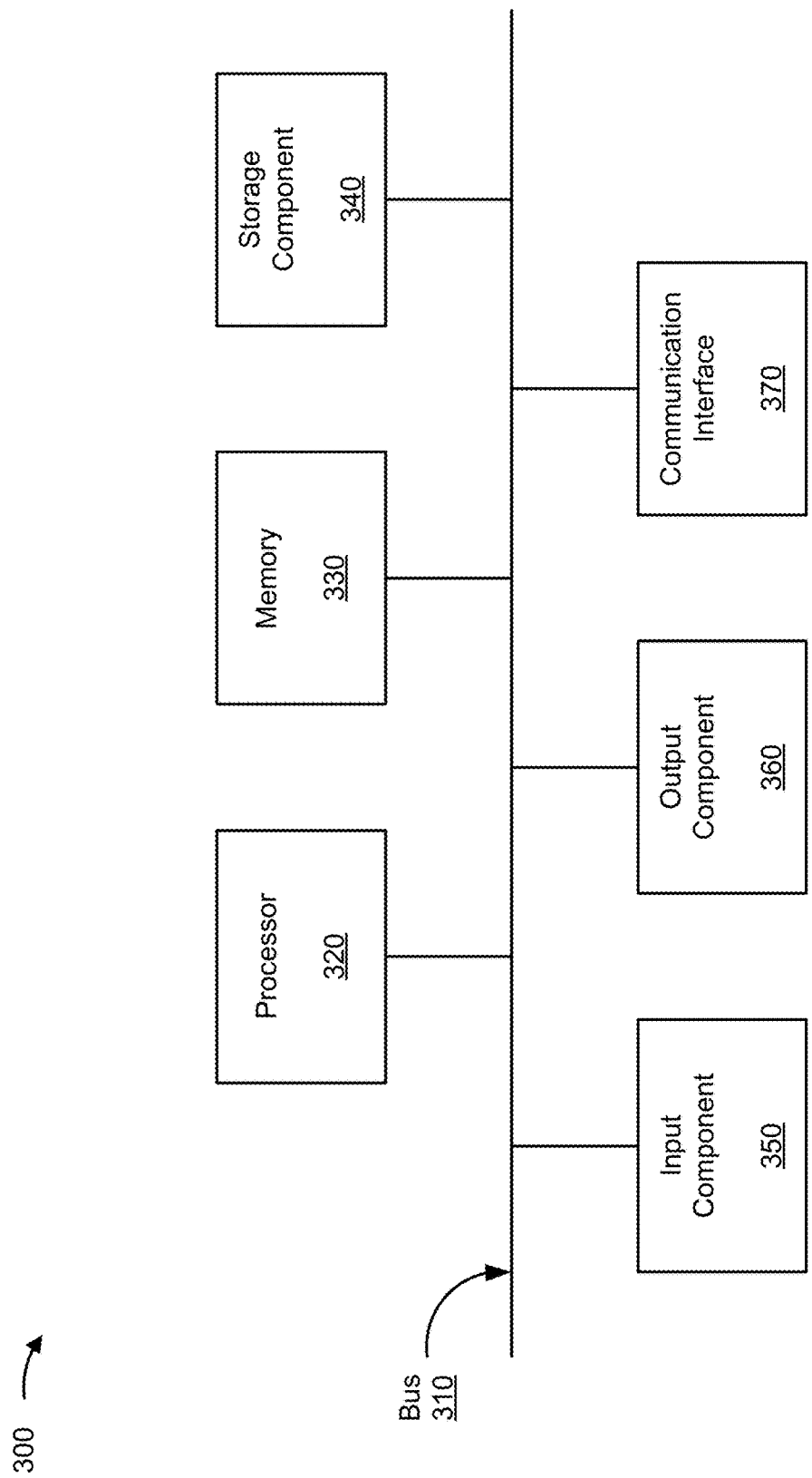
FIG. 3 is a diagram of example components of one or more devices of FIG. 2.

FIG. 3 is a diagram of example components of a device 300. Device 300 may correspond to the group of UEs 210, data storage device 220, and/or location tracking platform 230. In some implementations, the group of UEs 210, data storage device 220, and/or location tracking platform 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
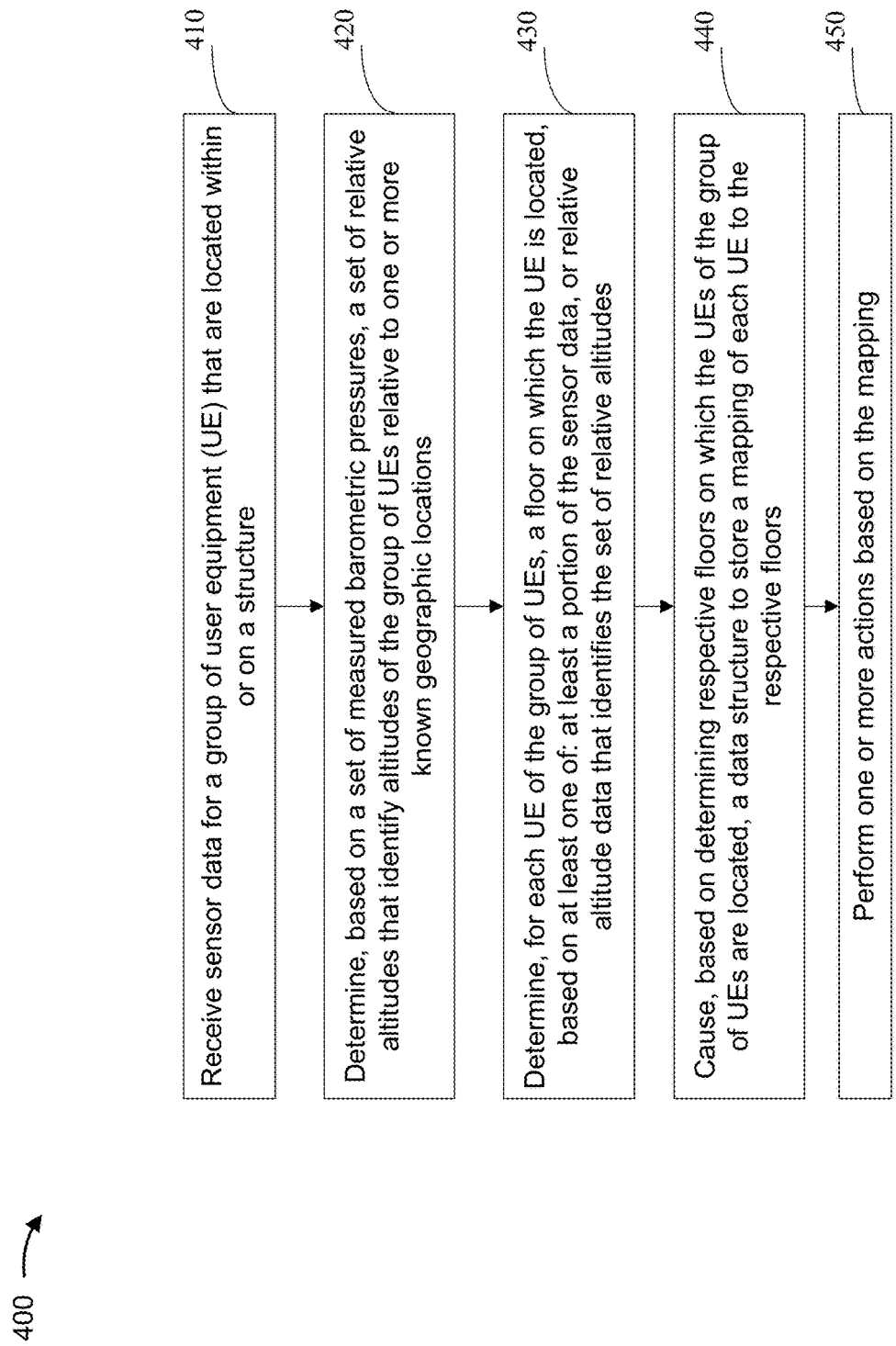
FIG. 4 is a flowchart of one or more example processes for determining which floors that user equipment (UE), of a group of UEs, are located on in a structure.

FIG. 4 is a flowchart of one or more example processes 400 for determining which floors that user equipment (UE), of a group of UEs, are located on in a structure. In some implementations, one or more process blocks of FIG. 4 may be performed by a location tracking platform (e.g., location tracking platform 230). In some implementations, one or more process blocks of FIG. 4 may be performed by another device or a group of devices separate from or including the location tracking platform, such as a group of user equipment (UE) (e.g., a group of UEs 210), a data storage device (e.g., a data storage device 220), and/or the like.

As shown in FIG. 4, process 400 may include receiving sensor data for a group of user equipment (UE) that are located within or on a structure (block 410). For example, the location tracking platform (e.g., using computing resource 235, processor 320, memory 330, storage component 340, input component 350, communication interface 370, and/or the like) may receive sensor data for a group of UE that are located within or on a structure, as described above. In some implementations, the sensor data may include location data that identifies a set of geographic locations of the group of UEs, and pressure data that identifies a set of measured barometric pressures that correspond to the set of geographic locations. In some implementations, the sensor data may include accelerometer data that is capable of being used to determine directions in which particular UEs are moving.

In some implementations, the location tracking platform may determine a barometric pressure bias for a UE, of the group of UEs, based on a difference between a measured barometric pressure that is determined by the UE and one or more values (e.g., an average) that are based on other measured barometric pressures determined by one or more other UEs that are within a threshold distance of the UE.

Additionally, the location tracking platform may update particular pressure data that corresponds to the UE based on the barometric pressure bias.

In some implementations, the location tracking platform may determine spatial dimensions associated with the respective floors that the UEs are located on by processing the sensor data and the relative altitude data using a Kalman filtering technique.

In some implementations, the location tracking platform may identify a first one or more measured barometric pressures associated with a first one or more UEs that are located on a first floor. Additionally, the location tracking platform may identify a second one or more measured barometric pressures associated with a second one or more UEs that are located on a second floor, adjacent to the first floor. Additionally, the location tracking platform may determine spatial dimensions of at least the first floor or the second floor based on the measured barometric pressure and a difference between the first one or more measured barometric pressures and the second one or more measured barometric pressures.

In some implementations, the location tracking platform may generate a graphical distribution of floor height probabilities that identify likelihoods of the floor being particular heights. Additionally, the location tracking platform may determine, for the set of floors, floor height lower bound values and floor height upper bound values based on the graphical distribution, where the floor height lower bound values and floor height upper bound values correspond to threshold distribution values. Additionally, the location tracking platform may verify, for each of the UEs, the floor on which the UE is located based on data that identifies the set of relative altitudes, the floor height upper bound values, and the floor height lower bound values.

In some implementations, the location tracking platform may determine, based on the accelerometer data, that a UE has moved in a vertical direction. Additionally, the location tracking platform may receive additional sensor data from the UE that includes additional pressure data that identifies a measured barometric pressure of the UE.

As further shown in FIG. 4, process 400 may include determining, based on a set of measured barometric pressures, a set of relative altitudes that identify altitudes of the group of UEs relative to one or more known geographic locations (block 420). For example, the location tracking platform (e.g., using processor 320, memory 330, storage component 340, and/or the like) may determine, based on a set of measured barometric pressures, a set of relative altitudes that identify altitudes of the group of UEs relative to one or more known geographic locations, as described above.

In some implementations, the location tracking platform may determine a relative altitude of each UE based on the particular pressure data that has been updated and that corresponds to the UE. In some implementations, the location tracking platform may determine, for each UE, the floor on which the UE is located based on the relative altitude data that identifies the set of relative altitudes and data that identifies the spatial dimensions associated with the respective floors. In some implementations, the location tracking platform may determine, for each of the UEs, the floor on which the UE is located based on data that identifies the set of relative altitudes, the floor height upper bound values, and the floor height lower bound values.

In some implementations, the location tracking platform may determine a barometric pressure bias for a UE, of the group of UEs, based on a difference between a measured barometric pressure that is determined by the UE and one or more values that are based on other measured barometric pressures determined by one or more other UEs that are within a threshold distance of the UE. Additionally, the location tracking platform may update particular pressure data that corresponds to the UE based on the barometric pressure bias. In this case, the location tracking platform may determine a relative altitude of each UE based on the particular pressure data that has been updated and that corresponds to the UE.

As further shown in FIG. 4, process 400 may include determining, for each UE of the group of UEs, a floor on which the UE is located, based on at least one of: at least a portion of the sensor data, or relative altitude data that identifies the set of relative altitudes (block 430). For example, the location tracking platform (e.g., using computing resource 235, processor 320, memory 330, storage component 340, and/or the like) may determine, for each UE of the group of UEs, a floor on which the UE is located, based on at least one of: at least a portion of the sensor data, or relative altitude data that identifies the set of relative altitudes, as described above. In some implementations, the floor may be part of a set of floors of the structure.

In some implementations, the location tracking platform may determine, for each of the UEs, the floor on which the UE is located based on the measured barometric pressure and a previously determined measured barometric pressure that corresponds to a particular geographic location that the UE was in prior to moving in the vertical direction.

In some implementations, the location tracking platform may determine, for each of the UEs, the floor on which the UE is located based on the relative altitude data, and data that identifies the spatial dimensions of the respective floors.

As further shown in FIG. 4, process 400 may include causing, based on determining respective floors on which the UEs of the group of UEs are located, a data structure to store a mapping of each UE to the respective floors (block 440). For example, the location tracking platform (e.g., using computing resource 235, processor 320, memory 330, storage component 340, input component 350, output component 360, communication interface 370, and/or the like) may cause, based on determining respective floors on which the UEs of the group of UEs are located, a data structure to store a mapping of each UE to the respective floors, as described above. In some implementations, the location tracking platform may generate, based on the mapping, a recommendation that is driven by machine learning. Additionally, the location tracking platform may provide the recommendation for display via an interface.

As further shown in FIG. 4, process 400 may include performing one or more actions based on the mapping (block 450). For example, the location tracking platform (e.g., using computing resource 235, processor 320, memory 330, storage component 340, input component 350, output component 360, communication interface 370, and/or the like) may perform one or more actions based on the mapping, as described above. In some implementations, the location tracking platform may cause display data to be displayed via an interface that is accessible to the group of UEs. The display data, for example, may include information identifying the floors n which the UEs are located.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
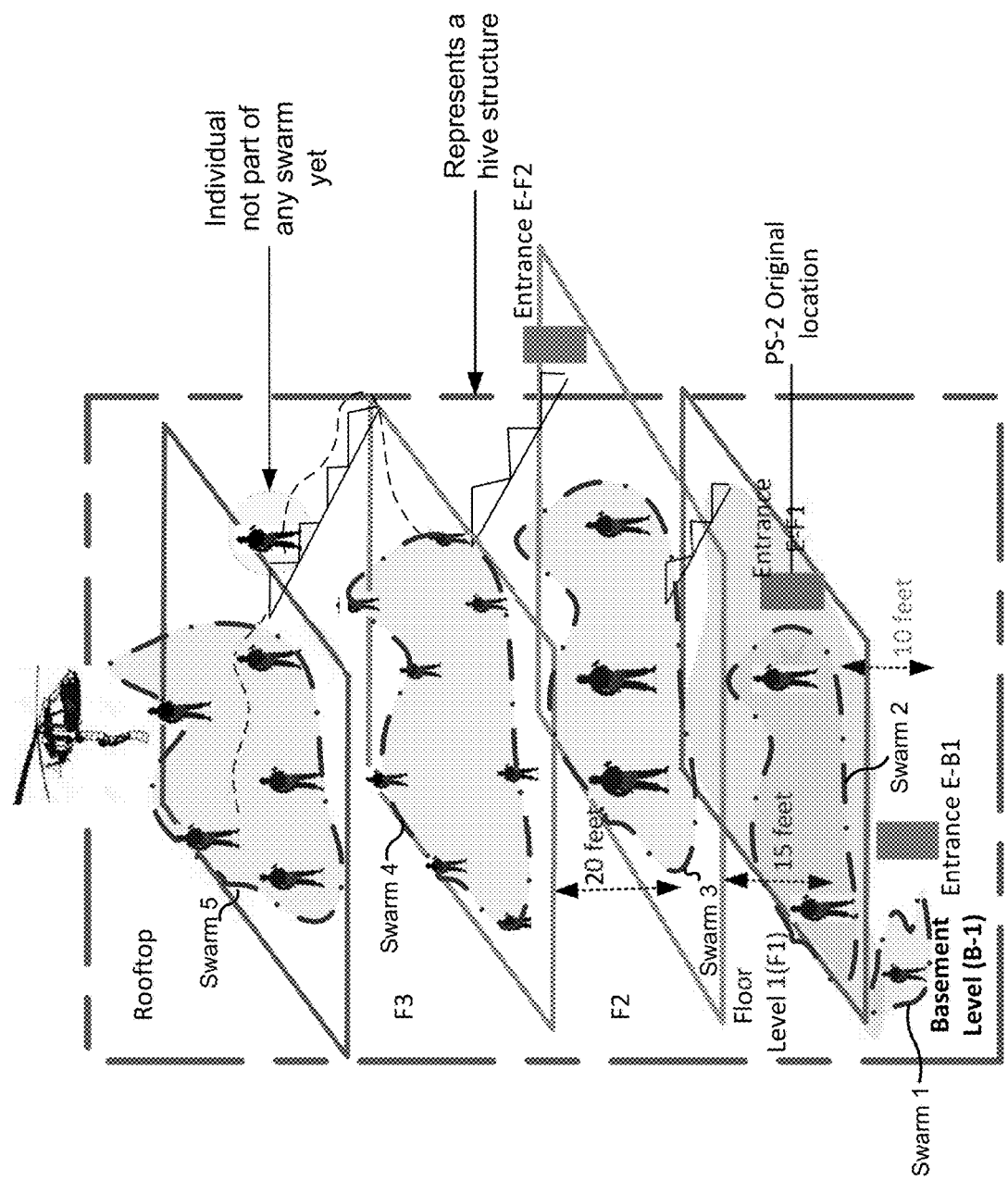
FIG. 5 is a diagram of one or more example implementations that illustrates a set of swarms that are part of a hive structure.

As shown in FIG. 5, one or more example implementations 500 illustrate a set of swarms that are part of a hive structure. For example, a group of users that are utilizing a corresponding group of user equipment (UE) may be dispersed on various floors of the hive structure. In this case, a location tracking platform may determine, for each UE of the group of UEs, a floor on which the UE is located (e.g., a swarm of which the UE is a part). For example, as the group of UEs are moving around within (and/or on top of) the structure, each UE may provide the location tracking platform with sensor data.

In some implementations, the location tracking platform may determine a set of relative altitudes for the group of UEs based on the sensor data. In some implementations, the location tracking platform may determine that UEs, of the group of UEs, are located on particular floors (e.g., part of particular swarms) of the structure. For example, the location tracking platform may determine that each UE, of the group of UEs, is located on a particular floor based on relative altitude data that identifies the relative altitudes for the group of UEs, as described elsewhere herein. Additionally, or alternatively, and as another example, the location tracking platform may determine that each UE is located on a particular floor based on a graphical distribution of floor height probabilities, based on a result of a Kalman filtering technique, based on a result of a machine learning technique, and/or the like, as described elsewhere herein.

In the example shown, the location tracking platform may determine, at a first time, that a first subset of UEs are located on a basement floor (e.g., part of a first swarm), that a second subset of UEs are located on a first floor (e.g., part of a second swarm), that a third subset of UEs are located on a second floor (e.g., part of a third swarm), that a fourth subset of UEs are located on a third floor (e.g., part of a fourth swarm), and that a fifth subset of UEs are located on a rooftop (e.g., part of a fifth swarm). Additionally, location tracking platform may periodically verify and/or re-determine, for each UE, that the UE is located on a particular floor. In the example shown, a user carrying a UE may begin to walk down stairs from the rooftop to the third floor. Consequently, when the location tracking platform verifies and/or re-determines that each UE is located on a particular floor, the location tracking platform will determine, based on accelerometer data, that the UE is moving to a different floor. This will allow the location tracking platform to identify the UE as being located on a third floor (e.g., once the UE finishes walking down the stairs). In this way, the location tracking platform efficiently and/or effectively determines, for each UE, the floor that the UE is located on at a particular time.

As indicated above, FIG. 5 is provided as one or more examples. Other examples can differ from what is described with regard to FIG. 5.

Figure 6:
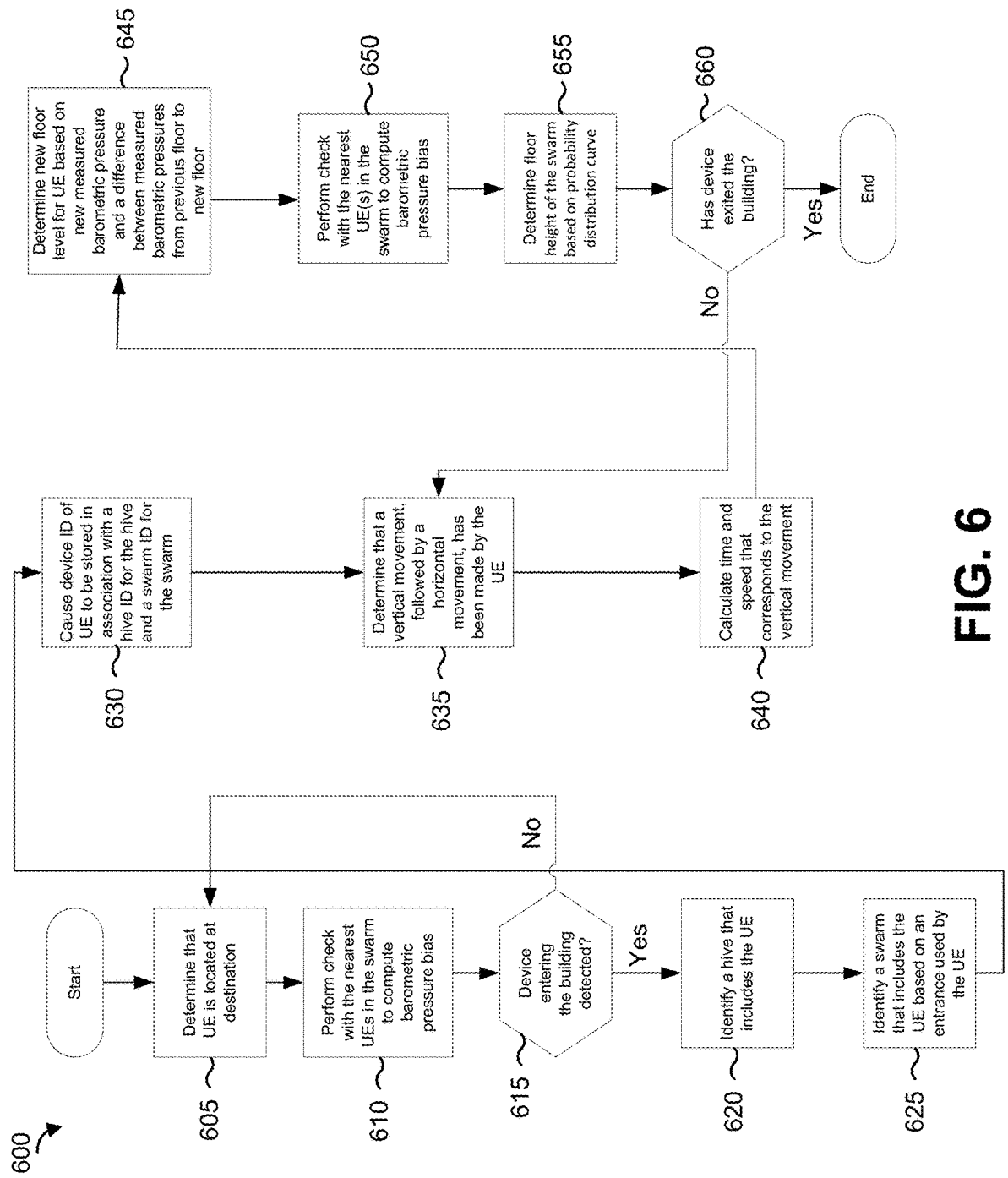
FIG. 6 is a flowchart of another example process for determining which floors that UEs, of a group of UEs, are located on in a structure.

FIG. 6 is a flowchart of an example process 600 for systems and methods for determining which floors that UEs, of a group of UEs, are located on in a structure. In some implementations, one or more process blocks of FIG. 6 may be performed by a location tracking platform (e.g., location tracking platform 230). In some implementations, one or more process blocks of FIG. 6 may be performed by another device or a group of devices separate from or including the location tracking platform, such as a group of user equipment (UE) (e.g., a group of UEs 210), a data storage device (e.g., a data storage device 220), and/or the like.

As shown in FIG. 6, process 600 may include determining that a UE is located at a destination (block 605). For example, the location tracking platform may determine that a UE is located at a destination based on a threshold change in speed over time (e.g., an individual who drove to the structure may have a UE that is moving at a slower speed than when the UE was being transported in a vehicle), based on a change in magnetism between a geographic location outside of the building and a geographic location inside of the building (e.g., as may be determined using magnetometer data that identifies magnetism readings), and/or the like.

As further shown in FIG. 6, process 600 may include performing a check with one or more nearby UEs in a swarm to compute a barometric pressure bias (block 610). For example, the location tracking platform may perform a check with one or more nearby UEs in a swarm to compute a barometric pressure bias. The check may include, for example, comparing a measured barometric pressure determined by the UE with one or more other measured barometric pressures that had been previously determined by the UE and/or that have been determined by one or more other UEs.

As further shown in FIG. 6, process 600 may include determining whether the UE has entered a building (block 615). For example, the location tracking platform may determine whether the UE has entered a building. If the location tracking platform determines that the UE has not entered the building, the location tracking platform may continue to determine whether the UE is located at the destination (as described in block 605).

As further shown in FIG. 6, process 600 may include identifying, based on determining that the UE has entered the building, a hive that includes the UE (block 620). For example, the location tracking platform may identify a hive that includes the UE.

As further shown in FIG. 6, process 600 may include identifying a swarm that includes the UE based on an entrance the UE used to access the building (block 625). For example, the location tracking platform may identify a swarm that includes the UE based on an entrance the UE used to access the building.

As further shown in FIG. 6, process 600 may include causing a device identifier of the UE to be stored in association with a hive identifier for the hive and a swarm identifier for the swarm (block 630). For example, the location tracking platform may cause a device identifier of the UE to be stored in association with a hive identifier for the hive and a swarm identifier for the swarm.

As further shown in FIG. 6, process 600 may include determining that a vertical movement, followed by a horizontal movement, has been made by the UE (block 635). For example, the location tracking platform may determine that vertical movement followed by horizontal movement has been made by the UE.

As further shown in FIG. 6, process 600 may include calculating a time and a speed that corresponds to the vertical movement (block 640). For example, the location tracking platform may calculate a time and a speed that corresponds to the vertical movement.

As further shown in FIG. 6, process 600 may include determining a new floor level for the UE based on a new measured barometric pressure and a difference between measured barometric pressures from an old floor level of the UE to the new floor level (block 645). For example, the location tracking platform may determine a new floor level for the UE based on a new measured barometric pressure and a difference between measured barometric pressures from an old floor level of the UE to the new floor level.

As further shown in FIG. 6, process 600 may include performing the check with the nearest UEs in the swarm to determine a barometric pressure bias (block 650). For example, the location tracking platform may perform the check with the nearest UEs in the swarm (e.g., which now excludes the UE) to determine a barometric pressure bias. The location tracking platform may also perform the check with UEs that are in the new swarm to compute barometric pressure bias for the UEs that are part of that swarm.

As further shown in FIG. 6, process 600 may include determining floor height corresponding to the swarm based on a probability distribution curve (block 655). For example, the location tracking platform may determine a floor height corresponding to the swarm based on a probability distribution curve. The probability distribution curve may be generated in a manner described elsewhere herein.

As further shown in FIG. 6, process 600 may include determining whether the UE has exited the building (block 660). For example, in some cases, the UE may determine whether the device has exited the building based on a speed at which the UE is traveling (e.g., certain speeds may indicative of traveling in a vehicle and thus signal to the UE that the device is no longer within the building). In other cases, the UE may determine whether the device has exited the building based on comparing location data of the device to other location data associated with known geographic locations (e.g., which may be indicative of the UE being outside of the building) and/or based on one or more other triggers.

If, for example, the UE determines that the device has exited the building, the UE may provide the location tracking platform with a message indicating that the device is no longer within the building. In other cases, the location tracking platform may determine that the UE has exited the building based on a threshold amount of time passing without receiving new sensor data and/or based on one or more other triggers.

If, for example, the UE determines that the device is still within the building, the UE may continue collecting and providing sensor data to the location tracking platform and the location tracking platform may continue to determine whether a vertical movement, followed by a horizontal movement, has been made by the UE (block 635).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or,"

unless explicitly stated otherwise (e.g., if used in combination with "either" or "only one of").

What is claimed is:

1. A method, comprising:
receiving, by a device, sensor data for a group of user equipment (UE) that are located within or on a structure,
wherein the sensor data includes:
location data that identifies a set of geographic locations of the group of UEs, and
pressure data that identifies a set of measured barometric pressures that correspond to the set of geographic locations;
determining, by the device and based on the set of measured barometric pressures, a set of relative altitudes that identify altitudes of the group of UEs relative to one or more known geographic locations;
determining, by the device, spatial dimensions associated with respective floors of a set of floors of the structure that the group of UEs are located on by processing the sensor data and relative altitude data that identifies the set of relative altitudes;
determining, by the device and for each UE of the group of UEs, a floor on which each UE is located,
wherein the floor is part of the set of floors of the structure, and
wherein the floor is determined based on at least one of:
data that identifies the spatial dimensions associated with the respective floors, or
the relative altitude data;
causing, by the device and based on determining respective floors on which UEs of the group of UEs are located, a data structure to store a mapping of each UE to the respective floors; and
performing, by the device, one or more actions based on the mapping.

2. The method of claim 1, further comprising:
determining a barometric pressure bias for a UE, of the group of UEs, based on a difference between a measured barometric pressure that is determined by the UE and one or more values that are based on other measured barometric pressures determined by one or more other UEs that are within a threshold distance of the UE; and
updating particular pressure data that corresponds to the UE based on the barometric pressure bias; and
wherein determining the set of relative altitudes comprises:
determining a relative altitude of each UE based on the particular pressure data that has been updated and that corresponds to each UE.

3. The method of claim 1, wherein the sensor data further includes accelerometer data that is capable of being used to determine directions in which particular UEs are moving; and
wherein the method further comprises:
determining, based on the accelerometer data and for each UE of the group of UEs, a distance that each UE traveled between a first geographic location corresponding to a first time and a second geographic location corresponding to a second time; and
determining spatial dimensions of one or more floors, of the set of floors, based on distances traveled by group of UEs between the first time and the second time,
wherein the spatial dimensions of group one or more floors are used to determine, for each UE of the group of UEs, the floor on which each UE is located.

4. The method of claim 1,
wherein determining the spatial dimensions associated with the respective floors that the UEs are located on by processing the sensor data and the relative altitude data comprises:
determining the spatial dimensions associated with the respective floors that the UEs are located on by processing the sensor data and the relative altitude data using a Kalman filtering technique.

5. The method of claim 4, further comprising:
identifying a first one or more measured barometric pressures associated with a first one or more UEs that are located on a first floor;
identifying a second one or more measured barometric pressures associated with a second one or more UEs that are located on a second floor, adjacent to the first floor; and
determining spatial dimensions of at least the first floor or the second floor based on the measured barometric pressure and a difference between the first one or more measured barometric pressures and the second one or more measured barometric pressures.

6. The method of claim 1, further comprising:
generating a graphical distribution of floor height probabilities that identify likelihoods of the floor being particular heights; and
determining, for the set of floors, floor height lower bound values and floor height upper bound values based on the graphical distribution,
wherein the floor height lower bound values and floor height upper bound values correspond to threshold distribution values; and
verifying, for each of the UEs, the floor on which each UE is located based on data that identifies the set of relative altitudes, the floor height upper bound values, and the floor height lower bound values.

7. The method of claim 1, wherein the sensor data further includes accelerometer data that is capable of being used to determine directions in which UEs are moving; and
wherein the method further comprises:
determining, based on the accelerometer data, that a UE has moved in a vertical direction; and
receiving additional sensor data from the UE that includes additional pressure data that identifies a measured barometric pressure of the UE; and
wherein determining, for each UE of the group of UEs, the floor on which each UE is located comprises:
determining, for each of the UEs, the floor on which each UE is located based on the measured barometric pressure and a previously determined measured barometric pressure that corresponds to a particular geographic location that each UE was in prior to moving in the vertical direction.

8. A device, comprising:
one or more memories; and
one or more processors, communicatively coupled to the one or more memories, to:
receive location data that identifies a set of geographic locations of a group of user equipment (UE) that are located within or on a structure;
receive pressure data that identifies a set of measured barometric pressures that correspond to the set of geographic locations;
determine, based on the set of measured barometric pressures, a set of relative altitudes that identify altitudes of the group of UEs relative to one or more known geographic locations;

determine spatial dimensions associated with respective floors of a set of floors of the structure that the group of UEs are located on by processing the location data, the pressure data, and relative altitude data that identifies the set of relative altitudes;

determine, for each UE of the group of UEs, a floor on which each UE is located,
  wherein the floor is part of the set of floors, and
  wherein the floor is determined based on at least one of:
    the location data,
    the pressure data, or
    the relative altitude data;

cause, based on determining respective floors on which each UE of the group of UEs are located, a data structure to store a mapping of each UE to the respective floors; and perform one or more actions based the mapping.

9. The device of claim 8, wherein the one or more processors are further to:
  determine a barometric pressure bias for a UE, of the group of UEs, based on a difference between a measured barometric pressure that is determined by the UE and one or more values that are based on other measured barometric pressures determined by one or more other UEs that are within a threshold distance of the UE;
  update particular pressure data that corresponds to the UE based on the barometric pressure bias; and
  wherein the one or more processors, when determining the set of relative altitudes, are to:
    determine a relative altitude of each UE based on the particular pressure data that has been updated and that corresponds to each UE.

10. The device of claim 8, wherein the one or more processors are further to:
  receive accelerometer data associated with a particular UE of the group of UEs;
  determine one or more directions in which the particular UE is moving based on the accelerometer data; and
  wherein the one or more processors, when determining, for each UE of the group of UEs, the floor on which each UE is located, are to:
    determine a particular floor on which the particular UE is located on based on the one or more directions in which the particular UE is moving.

11. The device of claim 8, wherein the one or more processors are further to:
  identify a first one or more measured barometric pressures associated with a first one or more UEs that are located on a first floor;
  identify a second one or more measured barometric pressures associated with a second one or more UEs that are located on a second floor, adjacent to the first floor; and
  determine spatial dimensions of at least the first floor or the second floor based on the measured barometric pressure and a difference between the first one or more measured barometric pressures and the second one or more measured barometric pressures.

12. The device of claim 8, wherein the one or more processors are further to:
  predict spatial dimensions of the respective floors on which the group of UEs are located by using a data model, that has been trained using machine learning, to process relative altitude data that identifies the set of relative altitudes; and wherein the one or more processors, when determining, for each UE of the group of UEs, the floor on which each UE is located, are to:
    determine, for each of the UEs, the floor that each UE is located on based on the relative altitude data and data that identifies the spatial dimensions of the respective floors.

13. The device of claim 8, wherein the one or more processors are further to:
  generate a graphical distribution of floor height probabilities that identify likelihoods of a floor being particular heights; and
  determine, for the set of floors, floor height lower bound values and floor height upper bound values based on the graphical distribution; and
  wherein the one or more processors, when determining, for each UE of the group of UEs, the floor on which each UE is located, are to:
    determine, for each of the UEs, the floor that each UE is located on based on relative altitude data, the floor height upper bound values, and the floor height lower bound values.

14. The device of claim 8, wherein the one or more processors, when performing the one or more actions, are to:
  cause display data to be displayed via an interface that is accessible to the group of UEs.

15. A non-transitory computer-readable medium storing instructions, the instructions comprising:
  one or more instructions that, when executed by one or more processors of a device, cause the one or more processors to:
    receive, periodically over time, sensor data for a group of user equipment (UE) that are located within or on a structure,
      wherein the sensor data includes:
        location data that identifies a set of geographic locations of the group of UEs, and
        pressure data that identifies a set of measured barometric pressures that correspond to the set of geographic locations;
    determine, based on the set of measured barometric pressures, a set of relative altitudes that identify altitudes of the group of UEs relative to one or more known geographic locations;
    determine, based on the location data and relative altitude data that identifies the set of relative altitudes of the group of UEs, spatial dimensions of particular floors, of a set of floors of the structure, that UEs, of the group of UEs, are located on;
    determine spatial dimensions associated with respective floors of the set of floors of the structure that the UEs are located on by processing the sensor data and the relative altitude data;
    determine, for each UE of the group of UEs, a floor on which each UE is located,
      wherein the determination is based on the location data, altitude data that identifies the set of relative altitudes, and data that identifies the spatial dimensions of the particular floors;
    cause, based on determining respective floors on which the UEs of the group of UEs are located, a data structure to store a mapping of each UE to the respective floors; and
    perform one or more actions based the mapping.

16. The non-transitory computer-readable medium of claim 15, wherein the sensor data includes accelerometer data that is capable of being used to determine directions that particular UEs are moving in;
  wherein the one or more instructions, when executed by the one or more processors, further cause the one or more processors to:
  determine, based on the accelerometer data and for each UE of the group of UEs, a distance that each UE traveled between a first geographic location corresponding to a first time and a second geographic location corresponding to a second time; and
  wherein the one or more instructions, that cause the one or more processors to determine the spatial dimensions of the particular floors, cause the one or more processors to:
    determine the spatial dimensions of the particular floors based on distances traveled by the UEs between the first time and the second time,
      wherein the spatial dimensions are used to determine, for each UE of the group of UEs, the floor on which each UE is located.

17. The non-transitory computer-readable medium of claim 15, wherein the one or more instructions, when executed by the one or more processors, further cause the one or more processors to:
  determine a barometric pressure bias for a UE, of the group of UEs, based on a difference between a measured barometric pressure that is determined by the UE and an average measured barometric pressure that identifies an average of one or more other measured barometric pressures that are determined by one or more of:
    the UE, or
    one or more other UEs that are within a threshold distance of the UE; and
  update particular pressure data that corresponds to the UE based on the barometric pressure bias; and
  wherein the one or more instructions, that cause the one or more processors to determine the set of relative altitudes, cause the one or more processors to:
    determine a relative altitude of the UE based on the particular pressure data that has been updated.

18. The non-transitory computer-readable medium of claim 15, wherein the sensor data further includes accelerometer data associated with a particular UE of the group of UEs;
  wherein the one or more instructions, when executed by the one or more processors, further cause the one or more processors to:
    determine one or more directions in which the particular UE is moving based on the accelerometer data; and
  wherein the one or more instructions, that cause the one or more processors to determine, for each UE of the group of UEs, the floor that each UE is located on, cause the one or more processors to:
    determine a particular floor that the particular UE is located on based on the one or more directions in which the particular UE is moving.

19. The non-transitory computer-readable medium of claim 15, wherein the one or more instructions, that cause the one or more processors to determine the spatial dimensions of the particular floors, cause the one or more processors to:
  generate a graphical distribution of floor height probabilities that identify likelihoods of a floor being particular heights;
  determine, for the set of floors, floor height lower bound values and floor height upper bound values based on the graphical distribution; and
  determine the spatial dimensions of the particular floors that the group of UEs are located on based on the floor height upper bound values and the floor height lower bound values.

20. The non-transitory computer-readable medium of claim 15, wherein the one or more instructions, that cause the one or more processors to perform the one or more actions, cause the one or more processors to:
  generate, based on the mapping, a recommendation that is driven by machine learning; and
  provide the recommendation for display via an interface.

* * * * *